US012646359B2

(12) United States Patent
Takahashi et al.

(10) Patent No.: US 12,646,359 B2
(45) Date of Patent: Jun. 2, 2026

(54) DISPLAY METHOD, DISPLAY TERMINAL, AND DISPLAY PROGRAM

(71) Applicant: Yanmar Holdings Co., Ltd., Osaka (JP)

(72) Inventors: Mamoru Takahashi, Osaka (JP); Masaaki Murayama, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 94 days.

(21) Appl. No.: 18/277,272

(22) PCT Filed: Jan. 21, 2022

(86) PCT No.: PCT/JP2022/002129
§ 371 (c)(1),
(2) Date: Aug. 15, 2023

(87) PCT Pub. No.: WO2022/176500
PCT Pub. Date: Aug. 25, 2022

(65) Prior Publication Data
US 2024/0096137 A1 Mar. 21, 2024

(30) Foreign Application Priority Data

Feb. 16, 2021 (JP) ................................. 2021-022415

(51) Int. Cl.
*G07C 5/00* (2006.01)
*A01D 34/00* (2006.01)
(Continued)

(52) U.S. Cl.
CPC ............. *G07C 5/00* (2013.01); *A01D 34/006* (2013.01); *B60K 35/00* (2013.01); *B60K 35/10* (2024.01);
(Continued)

(58) Field of Classification Search
CPC ........ G07C 5/00; A01D 34/006; B60K 35/00; B60K 35/10; B60K 35/22; B60K 2360/11;
(Continued)

(56) References Cited

U.S. PATENT DOCUMENTS 9,373,203 B1 * 6/2016 Fields ....................... A61B 5/18
2013/0289832 A1 * 10/2013 Pirotais .................. B60K 35/10
701/50
(Continued)

FOREIGN PATENT DOCUMENTS

JP 11-299305 A 11/1999
JP 2009-254280 A 11/2009
(Continued)

OTHER PUBLICATIONS

Japanese Office Action dated Jan. 9, 2024 issued in JP Application No. 2021-022415.
(Continued)

*Primary Examiner* — Andrea C Leggett
(74) *Attorney, Agent, or Firm* — NORTON ROSE FULBRIGHT US LLP

(57) ABSTRACT

This display method includes performing: displaying, in a first display region previously set in an operation display part, map information including at least the current position of a work vehicle; displaying, in a second display region previously set in the operation display part, a display item representing the current work situation of the work vehicle; and switching a first display item, which represents a first work situation being displayed in the second display region, into a second display item which represents a second work situation.

16 Claims, 16 Drawing Sheets

(51) Int. Cl.

| | |
|---|---|
| *B60K 35/00* | (2006.01) |
| *B60K 35/10* | (2024.01) |
| *B60K 35/22* | (2024.01) |
| *G05D 1/00* | (2006.01) |
| *G06F 3/048* | (2013.01) |
| *G06F 9/451* | (2018.01) |

(52) U.S. Cl.
CPC ............. *B60K 35/22* (2024.01); *G05D 1/021* (2013.01); *G06F 3/048* (2013.01); *G06F 9/451* (2018.02); *B60K 2360/11* (2024.01); *B60K 2360/171* (2024.01); *B60K 2360/61* (2024.01); *G06F 2203/04803* (2013.01)

(58) Field of Classification Search
CPC .......... B60K 2360/171; B60K 2360/61; G05F 1/021; G06F 3/048; G06F 9/451; G06F 2203/04803
See application file for complete search history.

(56) References Cited

U.S. PATENT DOCUMENTS

| | | | | |
|---|---|---|---|---|
| 2014/0298228 | A1* | 10/2014 | Meegan | G06F 3/0488 |
| | | | | 715/771 |
| 2016/0041803 | A1* | 2/2016 | Markov | G06F 3/147 |
| | | | | 701/48 |
| 2016/0169679 | A1* | 6/2016 | Kajino | G01S 19/42 |
| | | | | 701/491 |
| 2016/0202870 | A1* | 7/2016 | Takahashi | G06F 3/04842 |
| | | | | 715/821 |
| 2017/0045009 | A1* | 2/2017 | Ueda | B60W 10/30 |
| 2017/0115843 | A1* | 4/2017 | Lucas | A01C 7/102 |
| 2018/0206391 | A1* | 7/2018 | Shinkai | A01B 69/008 |
| 2018/0210449 | A1* | 7/2018 | Sakaguchi | A01B 69/008 |
| 2018/0277067 | A1* | 9/2018 | Tentinger | G06F 3/012 |
| 2019/0373805 | A1* | 12/2019 | Wataya | B60K 35/50 |
| 2019/0373806 | A1* | 12/2019 | Wataya | G06F 3/04855 |
| 2019/0389519 | A1* | 12/2019 | Bergsten | B62D 49/0692 |
| 2024/0096137 | A1* | 3/2024 | Takahashi | G07C 5/00 |

FOREIGN PATENT DOCUMENTS

| | | | |
|---|---|---|---|
| JP | 2015-160596 | A | 9/2015 |
| JP | 2018-113943 | A | 7/2018 |
| JP | 2018-147161 | A | 9/2018 |
| JP | 2019-088204 | A | 6/2019 |
| JP | 2019-214282 | A | 12/2019 |
| WO | 2016-013578 | A1 | 1/2016 |
| WO | 2016-063903 | A1 | 4/2016 |
| WO | 2018/055921 | A1 | 3/2018 |

OTHER PUBLICATIONS

International Search Report dated Feb. 22, 2022 issued in corresponding PCT Application PCT/JP2022/002129.
Extended European Search Report dated Dec. 17, 2024, issued in EP Application No. 22755824.4.

\* cited by examiner

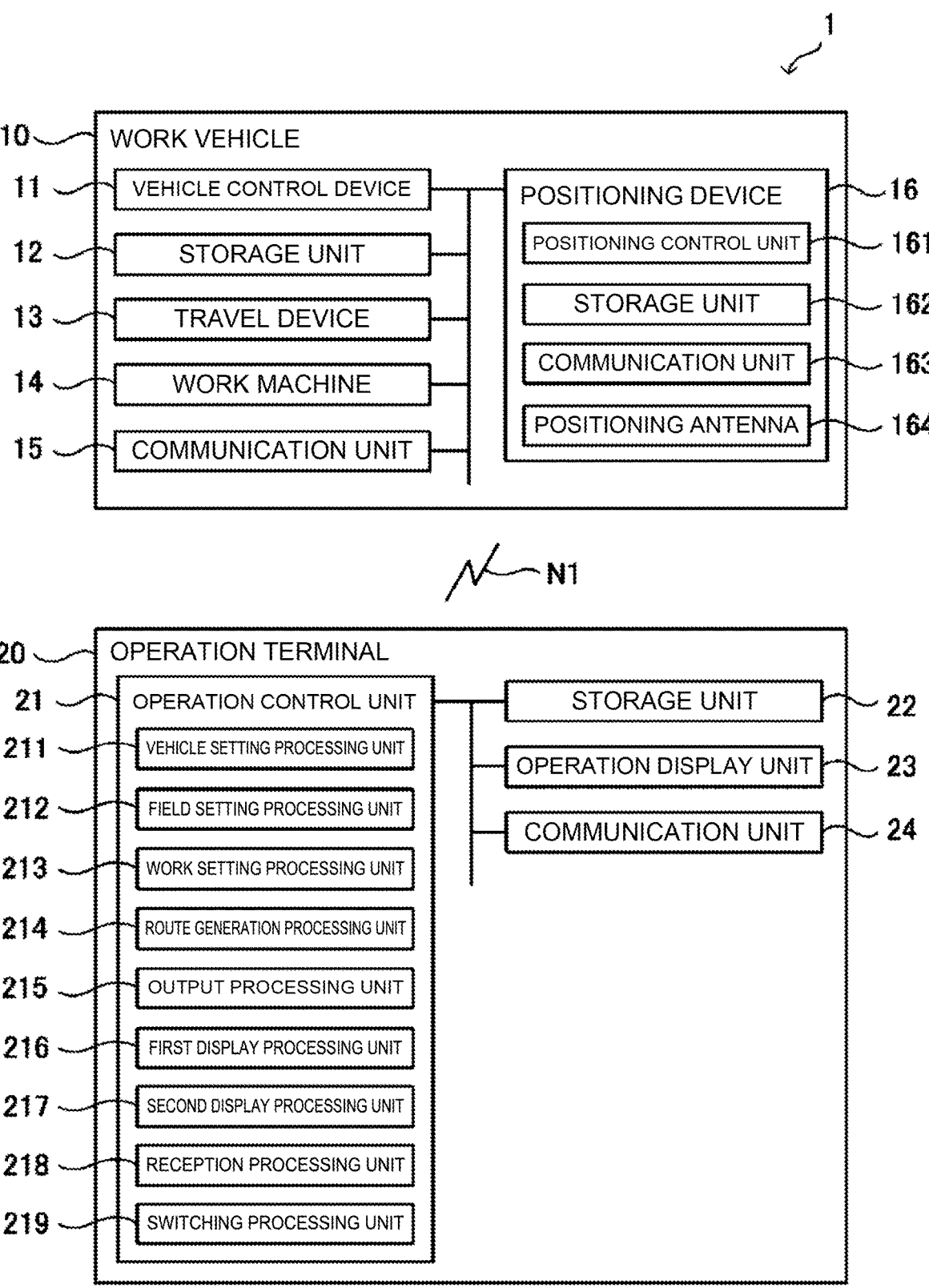

10 — WORK VEHICLE

11 — VEHICLE CONTROL DEVICE

12 — STORAGE UNIT

13 — TRAVEL DEVICE

14 — WORK MACHINE

15 — COMMUNICATION UNIT

16 — POSITIONING DEVICE

161 — POSITIONING CONTROL UNIT

162 — STORAGE UNIT

163 — COMMUNICATION UNIT

164 — POSITIONING ANTENNA

N1

20 — OPERATION TERMINAL

21 — OPERATION CONTROL UNIT

211 — VEHICLE SETTING PROCESSING UNIT

212 — FIELD SETTING PROCESSING UNIT

213 — WORK SETTING PROCESSING UNIT

214 — ROUTE GENERATION PROCESSING UNIT

215 — OUTPUT PROCESSING UNIT

216 — FIRST DISPLAY PROCESSING UNIT

217 — SECOND DISPLAY PROCESSING UNIT

218 — RECEPTION PROCESSING UNIT

219 — SWITCHING PROCESSING UNIT

22 — STORAGE UNIT

23 — OPERATION DISPLAY UNIT

24 — COMMUNICATION UNIT

FIG. 4

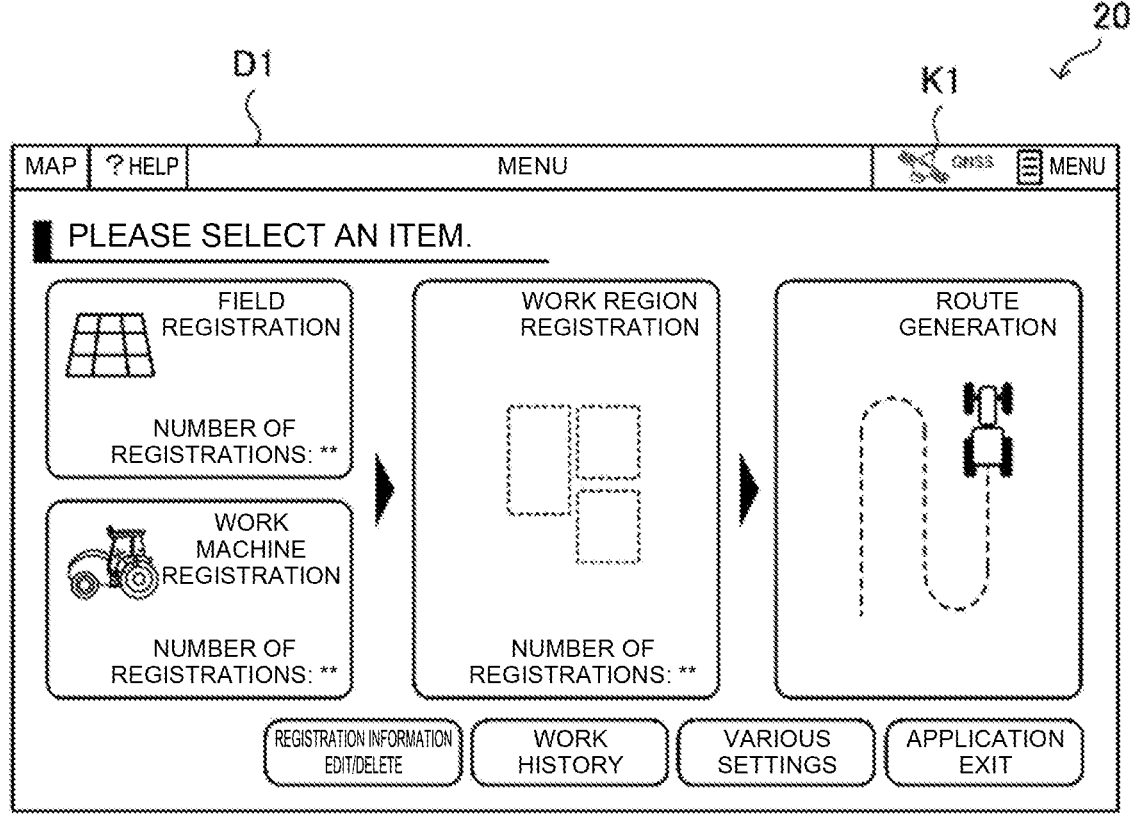

D1

K1

20

| MAP | ? HELP | MENU | ⚒ GNSS | ☰ MENU |

■ PLEASE SELECT AN ITEM.

FIELD REGISTRATION

NUMBER OF REGISTRATIONS: **

WORK MACHINE REGISTRATION

NUMBER OF REGISTRATIONS: **

WORK REGION REGISTRATION

NUMBER OF REGISTRATIONS: **

ROUTE GENERATION

| REGISTRATION INFORMATION EDIT/DELETE | WORK HISTORY | VARIOUS SETTINGS | APPLICATION EXIT |

| DISPLAY ITEM ID | DISPLAY ITEM NAME | WIDTH | PAGE |
|---|---|---|---|
| T001 | PTO ROTATION SPEED | W1 | P1 |
| T002 | VEHICLE SPEED | W1 | P1 |
| T003 | ENGINE ROTATION SPEED | W1 | P1 |
| T004 | WORK MACHINE HEIGHT | W1 | P1 |
| T005 | ENGINE LOAD FACTOR | W1 | P2 |
| T006 | DISTANCE TO HEADLAND | W1 | P2 |
| T007 | DEVIATION AMOUNT | W3 | P3 |
| T008 | ROUTE OFFSET TARGET VALUE | W4 | P4 |

OPERATION PANEL

WORK INFORMATION AND SETTINGS

OPERATION PANEL

WORK INFORMATION AND SETTINGS

OPERATION PANEL

WORK INFORMATION AND SETTINGS

OPERATION PANEL

WORK INFORMATION AND SETTINGS

| DISPLAY ITEM ID | DISPLAY ITEM NAME | WIDTH | PAGE NUMBER |
|---|---|---|---|
| C001 | STORAGE AMOUNT | W1 | P1 |
| C002 | ALLOWABLE REAPING TRAVEL DISTANCE | W1 | P2 |
| C003 | ENGINE LOAD FACTOR | W1 | P3 |
| C004 | DISTANCE TO HEADLAND | W1 | P3 |
| C005 | DEVIATION AMOUNT | W3 | P1, P2 |
| C006 | ROUTE OFFSET TARGET VALUE | W4 | P4 |

| DISPLAY ITEM ID | DISPLAY ITEM NAME | WIDTH | PAGE NUMBER |
|---|---|---|---|
| R001 | REMAINING WORK AREA | W1 | P1 |
| R002 | ENGINE LOAD FACTOR | W1 | P2 |
| R003 | DISTANCE TO HEADLAND | W1 | P2 |
| R004 | DEVIATION AMOUNT | W3 | P1 |
| R005 | ROUTE OFFSET TARGET VALUE | W4 | P3 |

OPERATION PANEL

WORK INFORMATION AND SETTINGS

OPERATION PANEL

WORK INFORMATION AND SETTINGS

DISPLAY METHOD, DISPLAY TERMINAL, AND DISPLAY PROGRAM

CROSS-REFERENCE TO RELATED APPLICATIONS

This application is a national stage application pursuant to 35 U.S.C. § 371 of International Application No. PCT/JP2022/002129, filed on Jan. 21, 2022, which claims priority under 35 U.S.C. § 119 to Japanese Patent Application No. 2021-022415 filed on Feb. 16, 2021, the disclosures of which are hereby incorporated by reference in their entireties.

TECHNICAL FIELD

The present invention relates to a display method, a display terminal, and a display program that causes a display unit of a display terminal to display information on work performed by a work vehicle.

BACKGROUND ART

Conventionally, a system is known that enables a user to grasp a working condition of a work vehicle that autonomously travels in a field by means of a display terminal. For example, Patent Literature 1 discloses a system capable of causing a display terminal to display a preset travel route (target route) of a work vehicle and a current position of the traveling work vehicle in a superimposed manner on a map, or to display a deviation amount between the travel route and the current position. Thus, the display terminal can display various display items representing the current working condition of the work vehicle.

CITATION LIST

Patent Literature

Patent Literature 1: Japanese Unexamined Patent Application Publication No. 2018-147161

DISCLOSURE OF INVENTION

Problems to be Solved by the Invention

Here, the display terminal may be commonly used in a plurality of different types of work vehicles such as a tractor, a combine harvester, and a rice transplanter. In this case, for example, when the display items displayed on the display terminal are uniformly set, some display items may be unnecessary for the user depending on the type of the work vehicle. In addition, since the display area (size) of the display unit of the display terminal is finite and the number of display items that can be displayed is limited, it is also difficult to cause the display unit to display a list of all display items corresponding to all types of work vehicles. As described above, in the related art, it is difficult to cause the display terminal to display work information corresponding to the display items suitable for the user.

An object of the present invention is to provide a display method, a display terminal, and a display program capable of causing the display terminal to display work information corresponding to display items suitable for a user.

Means for Solving the Problems

The display method according to the present invention is a display method that causes a display unit of a display terminal to display information on work performed by a work vehicle. The display method includes: causing to display, in a preset first display area of the display unit, map information including at least a current position of the work vehicle; causing to display, in a preset second display area of the display unit, a display item representing a current working condition of the work vehicle; and switching a first display item representing a first working condition displayed in the second display area to a second display item representing a second working condition.

The display terminal according to the present invention is a display terminal that causes a display unit to display information on work performed by a work vehicle. The display terminal includes a first display processing unit, a second display processing unit, and a switching processing unit. The first display processing unit causes to display, in a preset first display area of the display unit, map information including at least a current position of the work vehicle. The second display processing unit causes to display, in a preset second display area of the display unit, a display item representing a current working condition of the work vehicle. The switching processing unit switches a first display item representing a first working condition displayed in the second display area to a second display item representing a second working condition.

The display program according to the present invention is a display program that causes a display unit of a display terminal to display information on work performed by a work vehicle. The display program is a program causing one or more processors to execute: causing to display, in a preset first display area of the display unit, map information including at least a current position of the work vehicle; causing to display, in a preset second display area of the display unit, a display item representing a current working condition of the work vehicle; and switching a first display item representing a first working condition displayed in the second display area to a second display item representing a second working condition.

Effect of the Invention

The present invention provides a display method, a display terminal, and a display program that can cause a display terminal to display work information corresponding to display items suitable for a user.

BRIEF DESCRIPTION OF DRAWINGS

FIG. 1 is a block diagram illustrating a configuration of an automatic traveling system according to an embodiment of the present invention.

FIG. 4 is a diagram illustrating an example of a menu screen displayed on an operation terminal according to the embodiment of the present invention.

FIG. 5 is a diagram illustrating an example of display item information corresponding to the tractor, which is used in the operation terminal according to the embodiment of the present invention.

FIG. 10A is a diagram illustrating an example of display item information corresponding to a combine harvester, which is used in the operation terminal according to the embodiment of the present invention.

FIG. 10B is a diagram illustrating an example of display item information corresponding to a rice transplanter, which is used in the operation terminal according to the embodiment of the present invention.

DESCRIPTION OF EMBODIMENTS

Embodiments below are examples that embody the present invention and are not intended to limit the technical scope of the present invention.

Figure 2:
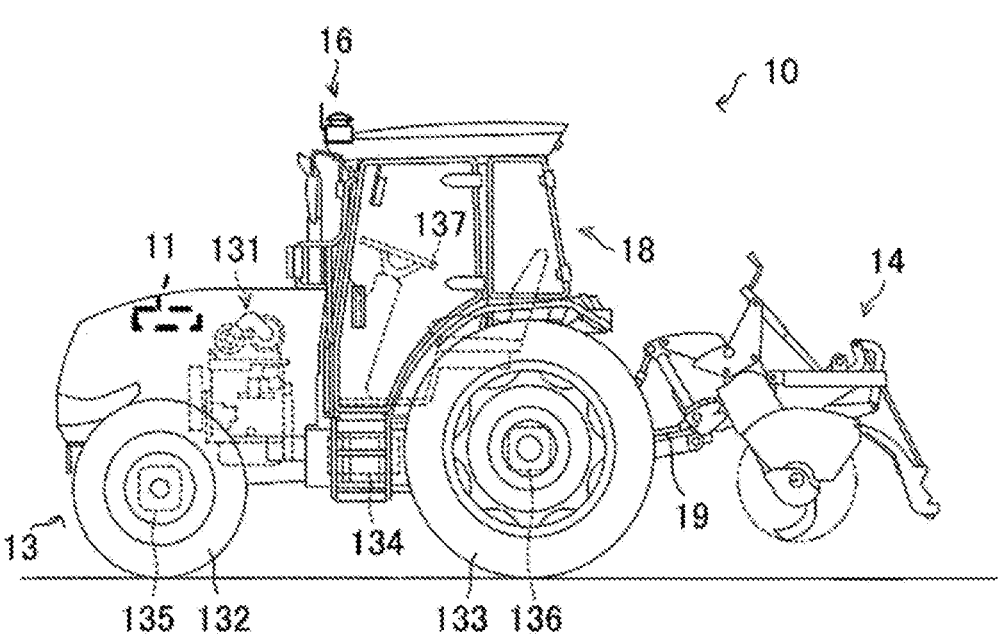
FIG. 2 is an external view of an example of a work vehicle (tractor) according to the embodiment of the present invention.

As illustrated in FIGS. 1 and 2, an automatic traveling system 1 according to an embodiment of the present invention includes a work vehicle 10 and an operation terminal 20. The work vehicle 10 and the operation terminal 20 can communicate with each other via a communication network N1. For example, the work vehicle 10 and the operation terminal 20 may communicate with each other via a mobile phone line network, a packet line network, or a wireless LAN. The automatic traveling system 1 is a system that causes the work vehicle 10 to travel automatically in a work region (e.g., a field F in FIG. 3).

The work vehicle of the present invention is a vehicle that performs specific work in the work region (field F), such as a tractor, a combine harvester, or a rice transplanter. In the present embodiment, a case where the work vehicle 10 is a tractor will be described as an example. Hereinafter, the work vehicle 10 will be referred to as a "tractor 10". Examples of cases where the work vehicle 10 is a combine harvester or a rice transplanter will be described later.

The tractor 10 is a so-called robot tractor having a configuration that enables automatic traveling (autonomous traveling) in the field F (see FIG. 3) along a preset travel route R (inner peripheral route Ra and outer peripheral route Rb). For example, the tractor 10 can automatically travel along the travel route R generated in advance for the field F based on position information of a current position of the tractor 10, which is positioned by a positioning device 16.

Figure 3:
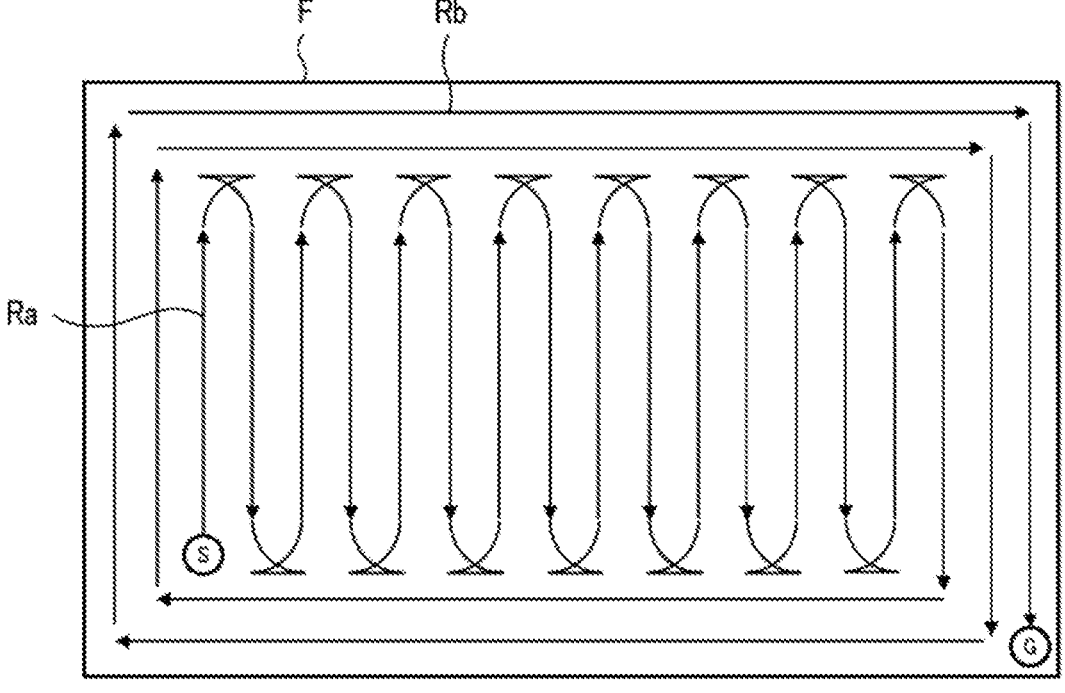
FIG. 3 is a diagram illustrating an example of a travel route of the work vehicle according to the embodiment of the present invention.

For example, in the work region of the field F illustrated in FIG. 3, the tractor 10 travels reciprocally in parallel along the inner peripheral route Ra from a work start position S, and travels in a spiral manner along the outer peripheral route Rb toward a work end position G. The travel route R is not limited to the route illustrated in FIG. 3, but can be set as appropriate in accordance with a work content.

The operation terminal 20 causes a display unit to display various pieces of information on work performed by the tractor 10, and receives an operation of a user (operator) to execute process in response to the operation. For example, the user operates the operation terminal 20 to set information necessary for the automatic traveling or output an automatic traveling start instruction to the tractor 10. In addition, the operation terminal 20 causes an operation display unit 23 (the display unit of the present invention) to display information such as a working condition and a traveling condition of the tractor 10 during automatic traveling. The user can grasp the working condition and the traveling condition on the operation terminal 20. The operation terminal 20 is an example of a display terminal of the present invention.

[Tractor 10]

As illustrated in FIGS. 1 and 2, the tractor 10 includes a vehicle control device 11, a storage unit 12, a travel device 13, a work machine 14, a communication unit 15, the positioning device 16, and the like. The vehicle control device 11 is electrically connected to the storage unit 12, the travel device 13, the work machine 14, the positioning device 16, and the like. Further, the vehicle control device 11 and the positioning device 16 may be capable of performing a wireless communication.

The communication unit 15 is a communication interface for connecting the tractor 10 to the communication network N1 in a wired or wireless manner and for executing a data communication according to a predetermined communication protocol with external devices such as the operation terminal 20 via the communication network N1.

The storage unit 12 is a non-volatile storage unit such as a hard disk drive (HDD) or a solid state drive (SSD) that stores various pieces of information. The storage unit 12 stores a control program such as an automatic traveling program for causing the vehicle control device 11 to execute automatic traveling process. For example, the automatic traveling program is non-transitorily recorded in a computer-readable recording medium such as a CD or a DVD, and is read out by a predetermined reading device (not illustrated) to be stored in the storage unit 12. Note that the automatic traveling program may be downloaded from a server (not illustrated) via the communication network N1 to the tractor 10 and stored in the storage unit 12. In addition, the storage unit 12 stores data (route data) of the travel route R generated in the operation terminal 20.

The travel device 13 is a driving unit that causes the tractor 10 to travel. As illustrated in FIG. 2, the travel device 13 includes an engine 131, front wheels 132, rear wheels 133, a transmission 134, a front axle 135, a rear axle 136, a steering wheel 137, and the like. Note that the front wheels 132 and the rear wheels 133 are respectively provided at right and left of the tractor 10. In addition, the travel device 13 is not limited to be of a wheel type including the front wheels 132 and the rear wheels 133 but may also be of a crawler type including crawlers provided at the right and left of the tractor 10.

The engine 131 is a driving source such as a diesel engine or a gasoline engine driven by using fuel supplied to a non-illustrated fuel tank. The travel device 13 may include an electric motor as a driving source, together with the engine 131 or instead of the engine 131. A non-illustrated power generator is connected to the engine 131, and electric power is supplied from the power generator to electric components such as the vehicle control device 11, a battery, and the like which are provided in the tractor 10. The battery is charged by the electric power supplied from the power generator. The electric components such as the vehicle control device 11 and the positioning device 16 provided in the tractor 10 can be driven by the electric power supplied from the battery even after the engine 131 is stopped.

Driving force of the engine 131 is transmitted to the front wheels 132 via the transmission 134 and the front axle 135, and is transmitted to the rear wheels 133 via the transmission 134 and the rear axle 136. In addition, the driving force of the engine 131 is also transmitted via a PTO shaft 19 to the work machine 14. When the tractor 10 performs automatic traveling, the travel device 13 performs travel movement according to a command of the vehicle control device 11.

The work machine 14 is, for example, a cultivator, a seeder, a mower, a plow, a fertilizer applicator or the like, and is attachable to and detachable from the tractor 10. Thus, the tractor 10 can perform various types of work by using each work machine 14. FIG. 2 illustrates an example in which the work machine 14 is the cultivator.

The steering wheel 137 is an operating unit operated by an operator or the vehicle control device 11. For example, in the travel device 13, the angle of the front wheels 132 is changed by a non-illustrated hydraulic power steering mechanism or the like in accordance with the operation of the steering wheel 137 by the vehicle control device 11, thereby to change an advancing direction of the tractor 10.

In addition, the travel device 13 includes a shift lever, an accelerator, a brake, and the like, which are not illustrated, operated by the vehicle control device 11, in addition to the steering wheel 137. Then, in the travel device 13, a gear of the transmission 134 is switched to a forward gear, a backward gear or the like in response to operation of the shift lever by the vehicle control device 11, and a traveling mode of the tractor 10 is switched to be forward, backward or the like. In addition, the vehicle control device 11 operates the accelerator, thereby to control a revolution speed of the engine 131. In addition, the vehicle control device 11 operates the brakes to stop the rotation of the front wheels 132 and the rear wheels 133 by using electromagnetic brakes.

The positioning device 16 is a communication device that includes a positioning control unit 161, a storage unit 162, a communication unit 163, a positioning antenna 164, and the like. For example, as illustrated in FIG. 2, the positioning device 16 is provided on an upper portion of a cabin 18 in which the operator boards. In addition, an installation position of the positioning device 16 is not limited to the cabin 18. Furthermore, the positioning control unit 161, the storage unit 162, the communication unit 163, and the positioning antenna 164 of the positioning device 16 may be dispersedly located at different positions in the tractor 10. Note that, as described above, the battery is connected to the positioning device 16, so that the positioning device 16 can operate even when the engine 131 is stopped. In addition, as the positioning device 16, a mobile phone terminal, a smart phone, a tablet terminal, or the like, for example, may be substituted.

The communication unit 163 is communication interface for connecting the positioning device 16 to the communication network N1 in a wired or wireless manner and for executing a data communication according to a predetermined communication protocol with external devices such as a base station server via the communication network N1.

The positioning antenna 164 is an antenna that receives a radio wave (GNSS signal) to be transmitted from a satellite.

The positioning control unit 161 is a computer system that includes one or more processors and storage memories such as a non-volatile memory and a RAM. The storage unit 162 is a non-volatile memory or the like that stores a control program for causing the positioning control unit 161 to execute the positioning process and that stores data such as positioning information and movement information. For example, the control program is non-transiently recorded in a computer-readable recording medium such as a CD or a DVD, and is read by a given reading device (not illustrated) and thereby is stored in the storage unit 162. Note that the control program may be downloaded from a server (not illustrated) via the communication network N1 to the positioning device 16, to be stored in the storage unit 162.

The positioning control unit 161 calculates a position (current position) of the tractor 10 based on the GNSS signal that is received by the positioning antenna 164 from the satellite. For example, in the case where the tractor 10 travels automatically in the field F, when the positioning antenna 164 receives radio waves (emission time, orbital information, and the like) emitted from each of a plurality of satellites, the positioning control unit 161 calculates a distance between the positioning antenna 164 and each of the satellites and calculates a current position (a latitude and a longitude) of the tractor 10 based on the calculated distance. In addition, the positioning control unit 161 may perform a positioning by a real-time kinematic method (RTK-GPS positioning method (RTK method)) in which the current position of the tractor 10 is calculated by using correction information that corresponds to a base station (reference station) near the tractor 10. As described above, the tractor 10 performs the automatic traveling by using, for example, the positioning information by the RTK method.

The vehicle control device 11 includes control devices such as a CPU, a ROM, a RAM, and the like. The CPU is a processor that executes various types of arithmetic processes. The ROM is a non-volatile storage unit that stores in advance control programs such as a BIOS and an OS for causing the CPU to execute various types of arithmetic processes. The RAM is a volatile or non-volatile storage unit that stores various pieces of information and is used as a transient storage memory (work region) for various processes executed by the CPU. The vehicle control device 11 controls the tractor 10 by causing the CPU to execute various types of control programs previously stored in the ROM or the storage unit 12.

Specifically, the vehicle control device 11 causes the tractor 10 to travel automatically based on the position information indicating the position of the tractor 10, which is positioned by the positioning control unit 161. For example, when the positioning state becomes a high-accuracy state in which RTK positioning can be performed (high-accuracy positioning completion) and the user presses a start button in the operation terminal 20, the operation terminal 20 outputs a work start instruction to the tractor 10. When the work start instruction is acquired from the operation terminal 20, the vehicle control device 11 causes the tractor 10 to start the automatic traveling based on the position information indicating the position of the tractor 10 positioned by the positioning control unit 161. As a result, the tractor 10 starts the automatic traveling along the travel route R (see FIG. 3) and starts work with the work machine 14. The travel route R along which the tractor 10 travels is generated, for example, by the operation terminal 20. The tractor 10 acquires route data of the travel route R from the operation terminal 20, and automatically travels in the field F along the travel route R.

In addition, the vehicle control device 11 causes the tractor 10 to stop the automatic traveling when a travel stop instruction is acquired from the operation terminal 20. For example, when the user presses a stop button in the operation terminal 20, the operation terminal 20 outputs the travel stop instruction to the tractor 10. When the travel stop instruction is acquired from the operation terminal 20, the vehicle control device 11 causes the tractor 10 to stop the automatic traveling. As a result, the tractor 10 stops the automatic traveling and stops the work with the work machine 14.

Although not illustrated in the figure, the tractor 10 may further include an obstacle sensor and a camera. The obstacle sensor is a sensor that detects obstacles in predetermined detection areas by using infrared rays, ultrasonic waves, or the like. For example, the obstacle sensor may be a LiDAR sensor (distance sensor) capable of three dimensionally measuring a distance to a measurement target (obstacle) using a laser, or may be a sonar sensor including a plurality of sonars capable of measuring a distance to a measurement target using ultrasonic waves. The obstacle sensor is installed in a front portion of the machine body of the tractor 10 and detects obstacles in front of the tractor 10. The obstacle sensor transmits measurement information (measurement distance) to the vehicle control device 11.

In addition, the camera is a digital camera that captures an image of an object and outputs the image as digital image data. The camera continuously images the object at a predetermined frame rate, generates frame images with a predetermined resolution, and transmits the frame images to the vehicle control device 11.

The vehicle control device 11 acquires measurement information from the obstacle sensor and acquires captured images from the camera. When an obstacle is detected, the vehicle control device 11 causes the tractor 10 to perform avoidance traveling or stop so as not to come into contact with the obstacle. In addition, the vehicle control device 11 also outputs the image data of the captured image acquired from the camera to the operation terminal 20. Upon acquiring the image data, the operation terminal 20 displays the captured image on an operation screen.

[Operation Terminal 20]

As illustrated in FIG. 1, the operation terminal 20 is an information processing device including an operation control unit 21, a storage unit 22, an operation display unit 23, a communication unit 24, and the like. The operation terminal 20 may include a portable terminal such as a tablet terminal or a smartphone.

The communication unit 24 is a communication interface for connecting the operation terminal 20 to the communication network N1 in a wired or wireless manner and for executing a data communication according to a predetermined communication protocol with one or more external devices, such as the tractor 10, via the communication network N1.

The operation display unit 23 is a user interface including a display unit such as a liquid crystal display or an organic EL display, which displays various pieces of information, and an operation unit such as a touch panel, a mouse, or a keyboard, which receives operations. The operator can perform an operation of setting and registering various pieces of information (work vehicle information, field information, work information, and the like to be described later) by operating the operation unit on an operation screen displayed on the display unit. In addition, the user can give a work start instruction, a run stop instruction and the like to the tractor 10 by operating the operation unit. Furthermore, the user can, at a location away from the tractor 10, check the traveling condition, the working condition, and the like of the tractor 10 automatically traveling in the field F along the travel route R, by means of information displayed on the operation terminal 20. The operation display unit 23 is an example of the display unit of the present invention.

The storage unit 22 is a non-volatile storage unit such as an HDD or an SSD that stores various pieces of information. The storage unit 22 stores a control program such as a display program for causing the operation control unit 21 to execute a display process (see FIG. 9) to be described later. For example, the display program is non-temporarily recorded in a computer-readable recording medium such as a CD and a DVD, read by a predetermined reading device (not illustrated), and stored in the storage unit 22. Note that the display program may be downloaded from a server (not illustrated) to the operation terminal 20 via the communication network N1 and be stored in the storage unit 22.

The operation control unit 21 has control devices such as a CPU, a ROM, and a RAM. The CPU is a processor that executes various types of arithmetic processes. The ROM is a non-volatile storage unit that stores in advance control programs such as a BIOS and an OS for causing the CPU to execute various types of arithmetic processes. The RAM is a volatile or non-volatile storage unit that stores various pieces of information and is used as a transient storage memory (work region) for various processes executed by the CPU. Then, the operation control unit 21 controls the operation terminal 20 by causing the CPU to execute various types of control programs, which are in advance stored in the ROM or the storage unit 22.

By the way, the operation terminal 20 may be commonly used in a plurality of different types of work vehicles 10 such as a tractor, a combine harvester, and a rice transplanter. Conventionally, in such cases, for example, when the display items displayed on the operation terminal 20 are uniformly set, some display items may be unnecessary for the user depending on the type of the work vehicle 10. In addition, since the display area (size) of the display unit of the operation terminal 20 is finite and the number of display items that can be displayed is limited, it is also difficult to cause the display unit to display a list of all display items corresponding to all types of work vehicles. As described above, in the related art, it is difficult to cause the operation terminal 20 to display work information corresponding to the display items suitable for the user. In contrast, it is possible to cause the operation terminal 20 according to the present embodiment to display work information corresponding to the display items suitable for the user.

Specifically, as illustrated in FIG. 1, the operation control unit 21 includes various processing units such as a vehicle setting processing unit 211, a field setting processing unit 212, a work setting processing unit 213, a route generation processing unit 214, an output processing unit 215, a first display processing unit 216, a second display processing unit 217, a reception processing unit 218, and a switching processing unit 219. The operation control unit 21 causes the CPU to execute various processes in accordance with the control programs to function as the various processing units. In addition, some or all of the processing units may consist of electronic circuits. Moreover, the control program may be a program that causes a plurality of processors to function as the processing units.

The vehicle setting processing unit 211 sets information on the tractor 10 (hereinafter referred to as "work vehicle information"). The vehicle setting processing unit 211 sets information on the type (model) of the tractor 10, the position where the positioning antenna 164 is mounted on the tractor 10, the type of the work machine 14, the size and shape of the work machine 14, the position of the work machine 14 with respect to the tractor 10, the vehicle speed and engine revolution speed of the tractor 10 during work, the vehicle speed and engine speed of the tractor 10 during turning, and the like by the user performing a registration operation of the information on the operation terminal 20.

For example, when the user starts the engine 131 of the tractor 10 and turns on power of the operation terminal 20, the first display processing unit 216 causes the operation display unit 23 to display a menu screen D1 illustrated in FIG. 4. The user selects, for example, "work machine registration" to register work machine information on the work machine 14.

The field setting processing unit 212 sets information on the field F (hereinafter, referred to as "field information"). The field setting processing unit 212 sets information on the position and the shape of the field F, the work start position S where the work starts, the work end position G where the work ends (see FIG. 3), a work direction, and the like by registration operation on the operation terminal 20. The work direction means a direction in which the tractor 10 travels while causing the work machine 14 to work in a work region, which is a region excluding non-work regions such as a headland and a non-cultivated land from the field F. For example, the user selects "field registration" on the menu screen D1 to register field information.

For example, the user boards and drives the tractor 10 so as to travel around an outer periphery of the field F once, and records transition of position information of the positioning antenna 164 at that time, so that the information on the position and the shape of the field F can be automatically acquired. In addition, the position and the shape of the field F can be also acquired based on a polygon obtained by the user operating the operation terminal 20 with a map being displayed on the operation terminal 20 and designating a plurality of points on the map. The area specified by the acquired position and the shape of the field F is an area (travel area) where the tractor 10 can be caused to travel.

The work setting processing unit 213 sets information on how to specifically perform the work (hereinafter, referred to as "work information"). The work setting processing unit 213 is configured to be able to set, as the work information, presence or absence of cooperative work between the tractor 10 (unmanned tractor) and the manned tractor 10, a skip number, which is the number of work routes skipped when the tractor 10 turns in the headland, a width of the headland, a width of the non-cultivated land, and the like. For example, the user selects "work region registration" on the menu screen D1 to register work information.

The route generation processing unit 214 generates the travel route R, which is a route for causing the tractor 10 to travel automatically, based on each piece of the set information. The travel route R is, for example, a work route from the work start position S to the work end position G (see FIG. 3). The travel route R illustrated in FIG. 3 includes the inner peripheral route Ra, along which the tractor 10 travels reciprocally in parallel in an inner area within the field F, and the outer peripheral route Rb, along which the tractor 10 travels while turning in a spiral manner in an outer area within the field F. The route generation processing unit 214 can generate and store the travel route R of the tractor 10 based on each piece of the set information set by the vehicle setting processing unit 211, the field setting processing unit 212, and the work setting processing unit 213. For example, the user selects "route generation" on the menu screen D1 and gives an instruction to generate the travel route R.

The route generation processing unit 214 generates the travel route R (see FIG. 3) based on the work start position S and the work end position G registered in the field setting. The travel route R is not limited to the route illustrated in FIG. 3. When the route generation processing unit 214 generates the travel route R, the output processing unit 215 transfers route data of the travel route R to the tractor 10.

The route data transferred from the operation terminal 20 is stored in the storage unit 12 of the tractor 10. As a result, the tractor 10 can perform the automatic traveling along the travel route R while the positioning device 16 positions the current position of the tractor 10. The current position of the tractor 10 usually coincides with the position of the positioning antenna 164.

The tractor 10 according to the present embodiment travels in a substantially rectangular field F as illustrated in FIG. 3. The tractor 10 is configured to be able to travel automatically when the current position thereof is located in the field F, and it is configured to be not able to travel automatically when the current position thereof is located outside the field F (on a public road or the like). In addition, the tractor 10 is configured to be able to travel automatically, for example, on condition that the current position coincides with the work start position S.

In a case where the current position of the tractor 10 coincides with the work start position S, when the user presses the start button on the operation terminal 20 to give the work start instruction, the vehicle control device 11 causes the tractor 10 to start the automatic traveling and causes the work machine 14 (see FIG. 2) to start work (e.g., cultivating work). That is, the tractor 10 permits the automatic traveling on the condition that the current position thereof coincides with the work start position S. The condition for permitting the automatic traveling of the tractor 10 is not limited to the above condition.

When the automatic traveling of the tractor 10 is permitted, the vehicle control device 11 causes the tractor 10 to travel automatically from the work start position S to the work end position G based on the travel route R. In addition, the vehicle control device 11 may cause the tractor 10 to travel automatically from the work end position G to an entrance of the field F when the tractor 10 ends the work. In addition, the vehicle control device 11 periodically outputs various measurement values (PTO rotation speed, vehicle speed, position information, etc.) to the operation terminal 20 while the tractor 10 automatically travels.

Figure 6A:
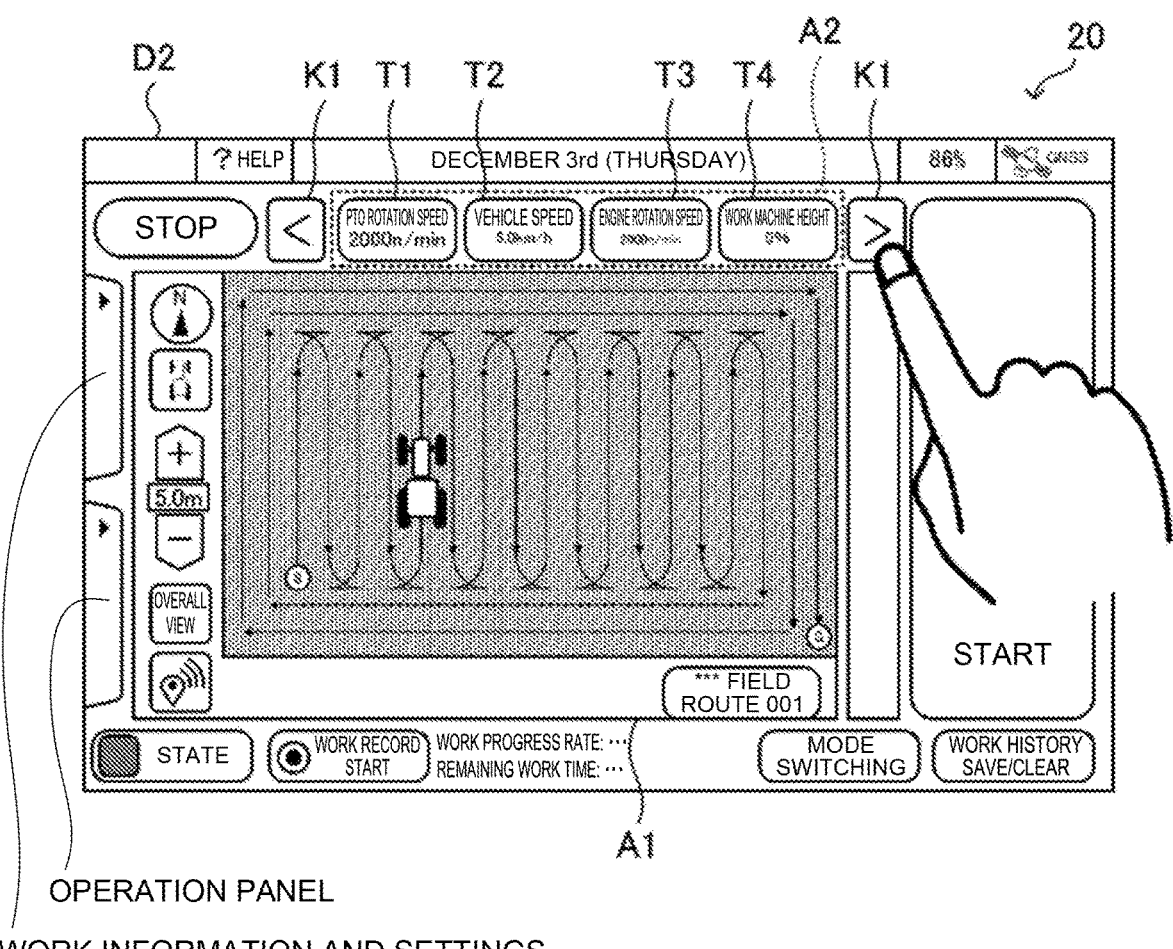
FIG. 6A is a diagram illustrating an example of an operation screen displayed on the operation terminal according to the embodiment of the present invention.

Here, when the tractor 10 automatically travels, the operation control unit 21 causes the operation display unit 23 of the operation terminal 20 to display an operation screen D2 (see FIG. 6A, etc.). Specifically, when the route data is normally transferred from the operation terminal 20 to the tractor 10, the operation control unit 21 causes the operation display unit 23 to display the operation screen D2. In addition, on the operation screen D2, the first display processing unit 216 causes to display, in a preset first display area A1 of the operation display unit 23, map information including at least the current position of the tractor 10. In the operation screen D2 illustrated in FIG. 6A, the map information including the field F, the travel route R, the work start position S, the work end position G, and the current position of the tractor 10 is displayed. On the operation screen D2, in addition to the map information, the first display processing unit 216 may cause function icons, such as a magnification icon for changing the map's display magnification and an orientation icon for changing the map's orientation, to be displayed.

In addition, on the operation screen D2, the second display processing unit 217 causes to display, in a preset second display area A2 of the operation display unit 23, display items representing the current working condition of the tractor 10. The display items are display icons (notification icons) that correspond to items such as a driving condition, a vehicle speed condition, and a position condition of the tractor 10 and display the current condition (measurement values, etc.) of each item. For example, on the operation screen D2 illustrated in FIG. 6A, a display item T1 representing a rotation speed of PTO (Power Take Off) of the tractor 10, a display item T2 representing a vehicle speed of the tractor 10, a display item T3 representing a rotation speed of the engine 131 of the tractor 10, and a display item T4 representing a height of the work machine 14 are displayed. The second display processing unit 217 sets the second display area A2 at a predetermined position on the operation screen D2 and causes to display the arrangeable number of display items in the second display area A2. For example, the second display processing unit 217 sets, on the operation screen D2, the position of the second display area A2 above the first display area A1. In addition, the second display processing unit 217 causes to display, in the second display area A2, the four display items T1 to T4 each having a width W1 (see FIG. 7) side by side. In addition, the operation control unit 21 acquires the measurement values to be displayed in each display item from the vehicle control device 11 of the tractor 10.

The switching processing unit 219 switches a first display item representing a first working condition displayed in the second display area A2 to a second display item representing a second working condition. Specifically, the switching processing unit 219 causes to display, at a position corresponding to the second display area A2 on the operation screen D2 of the operation display unit 23, a switching icon K1 that receives a switching operation from the user to switch the display item displayed (being displayed) in the second display area A2. For example, as illustrated in FIG. 6A, the switching processing unit 219 causes to display a left side switching icon K1 for instructing to return the display page at a position adjacent to a left end portion of the second display area A2, and a right side switching icon K1 for instructing to advance the display page at a position adjacent to a right end portion of the second display area A2. The switching icon K1 is a function icon for receiving a switching operation from the user and executing a predetermined process. The positions of the second display area A2 and the switching icon K1 on the operation screen D2 is not limited to the positions illustrated in FIG. 6A. The switching icon K1 (right side switching icon K1, left side switching icon K1) is an example of a switching unit of the present invention.

For example, as illustrated in FIG. 6A, when the user presses the right side switching icon K1 on the operation screen D2, the reception processing unit 218 receives the switching operation. When the reception processing unit 218 receives the switching operation, the switching processing unit 219 switches the display items displayed in the second display area A2. For example, the switching processing unit 219 switches from the display items T1 to T4 to display items T5 and T6 and causes to display, in the second display area A2, the display items T5 and T6 (see FIG. 6B). The switching processing unit 219 causes to display, in the second display area A2, the two display items T5 and T6 each having the width W1 (see FIG. 7) side by side. The display item T5 is a display icon representing a load factor of the engine 131 of the tractor 10, and the display item T6 is a display icon representing a distance from the current position of the tractor 10 to the headland. Further, when the user presses the left side switching icon K1 on the operation screen D2 illustrated in FIG. 6B, the switching processing unit 219 switches the display items T5 and T6 displayed in the second display area A2 to the original display items T1 to T4 (see FIG. 6A).

Figure 6B:
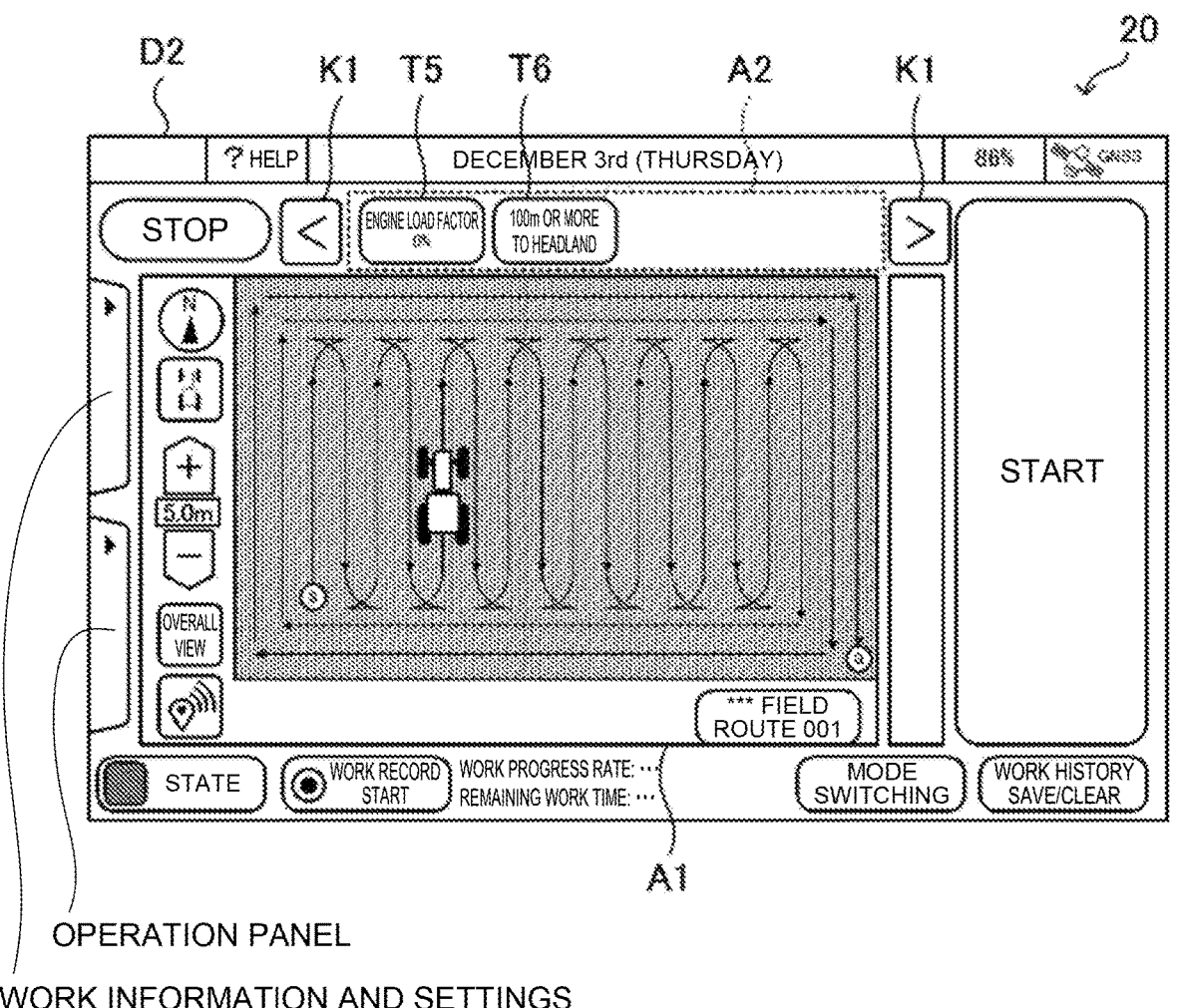
FIG. 6B is a diagram illustrating an example of the operation screen displayed on the operation terminal according to the embodiment of the present invention.
Figure 6C:
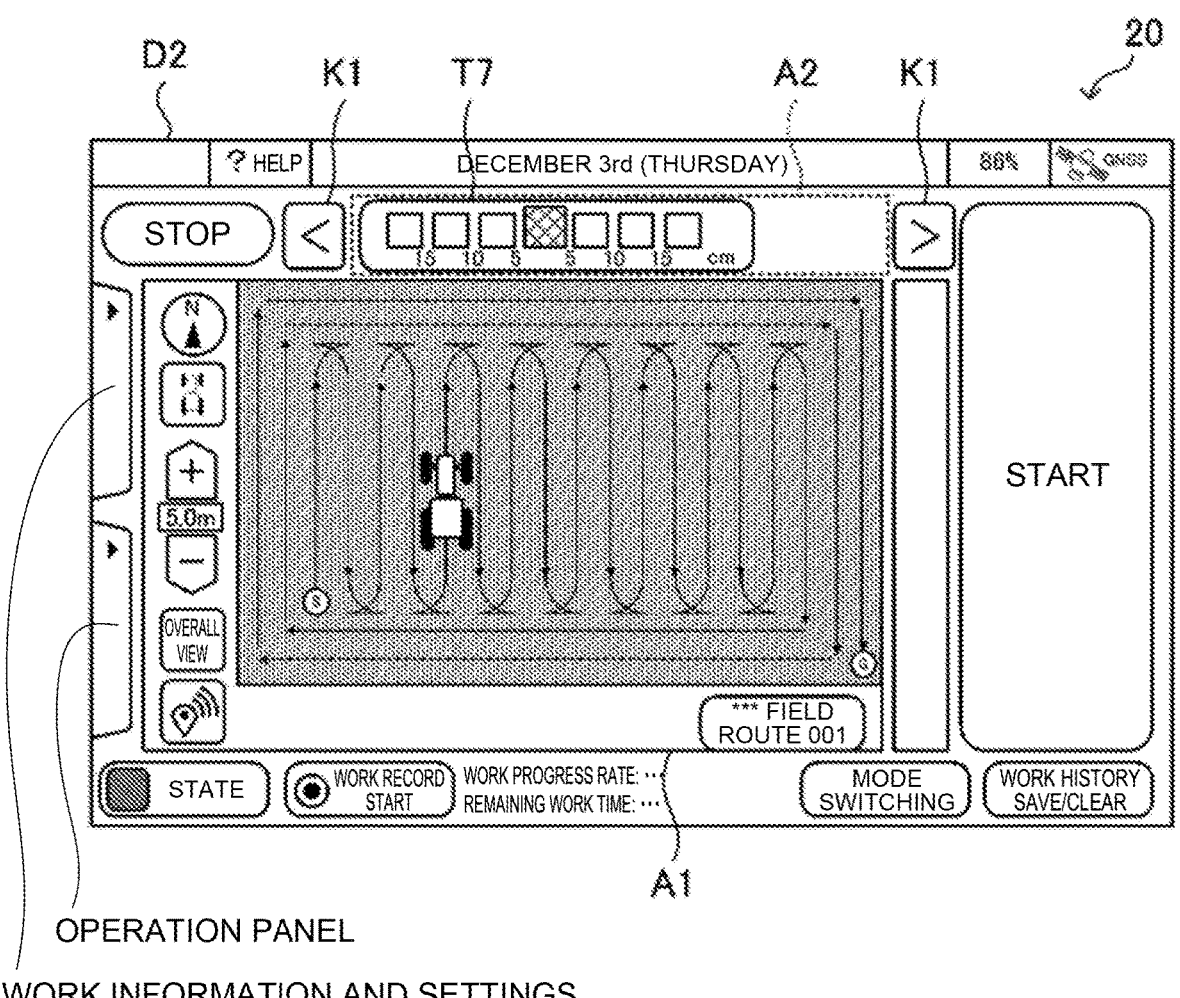
FIG. 6C is a diagram illustrating an example of the operation screen displayed on the operation terminal according to the embodiment of the present invention.

Furthermore, when the user presses the right side switching icon K1 on the operation screen D2 illustrated in FIG. 6B, the switching processing unit 219 switches from the display items T5 and T6 to a display item T7 and causes to display, in the second display area A2, the display item T7 (see FIG. 6C). The switching processing unit 219 causes to display the one display item T7 having a width W3 (see FIG. 7) in the second display area A2. The display item T7 is a display icon representing a positional displacement amount (deviation amount) between the preset travel route R (target route of the present invention) and the travel route (current position) that the tractor 10 is currently traveling. Further, when the user presses the left side switching icon K1 on the operation screen D2 illustrated in FIG. 6C, the switching processing unit 219 switches the display item T7 displayed in the second display area A2 to the original display items T5 and T6 (see FIG. 6B).

Figure 6D:
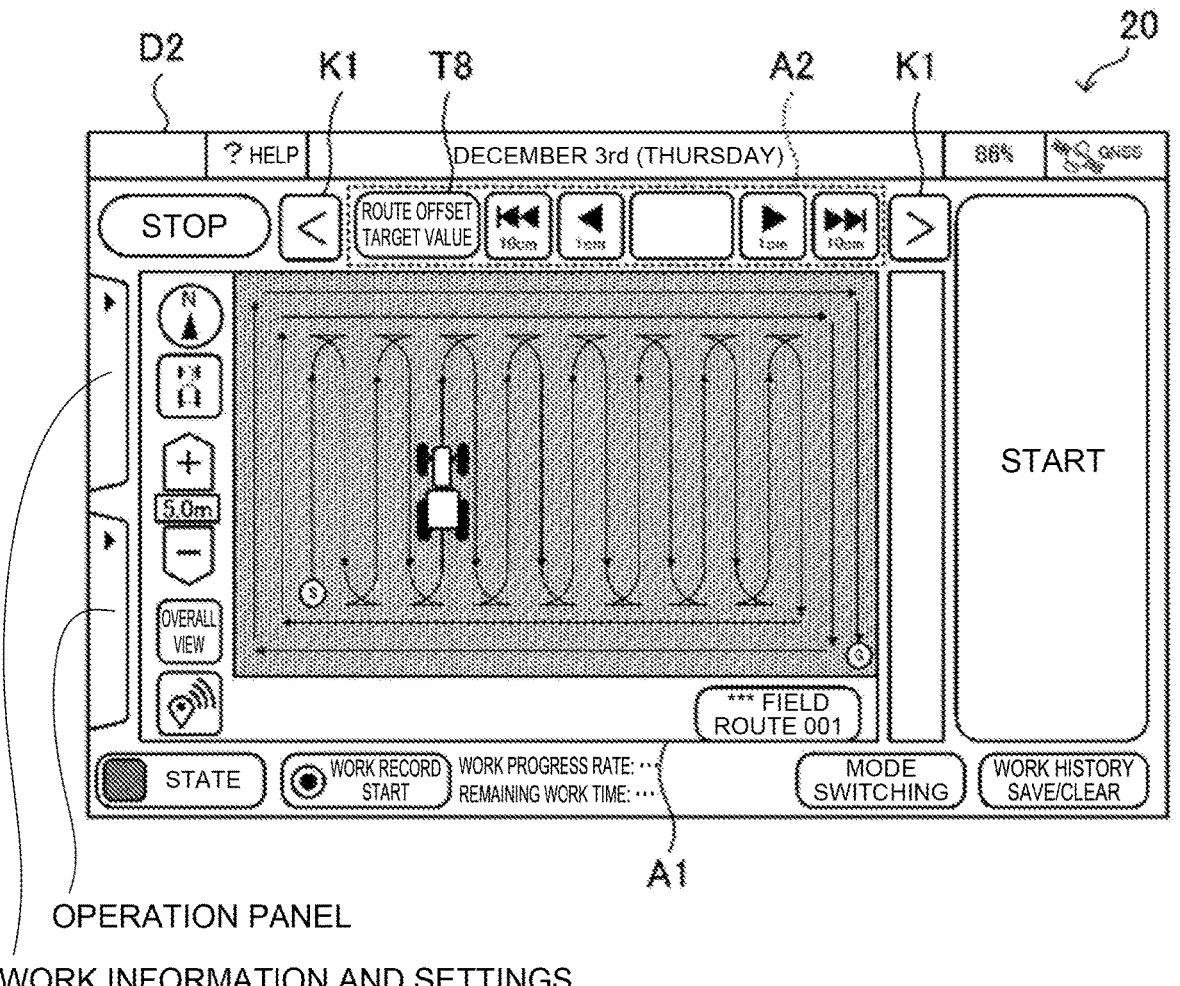
FIG. 6D is a diagram illustrating an example of the operation screen displayed on the operation terminal according to the embodiment of the present invention.

Furthermore, when the user presses the right side switching icon K1 on the operation screen D2 illustrated in FIG. 6C, the switching processing unit 219 switches from the display item T7 to a display item T8 and causes to display, in the second display area A2, the display item T8 (see FIG. 6D). The switching processing unit 219 causes to display the one display item T8 having a width W4 (see FIG. 7) in the second display area A2. The display item T8 is a setting icon for correcting the travel route along which the tractor 10 is currently traveling. The user can set a correction amount by operating the display item T8. Further, when the user presses the left side switching icon K1 on the operation screen D2 illustrated in FIG. 6D, the switching processing unit 219 switches the display item T8 displayed in the second display area A2 to the original display item T7 (see FIG. 6C). In addition, when the user presses the right side switching icon K1 on the operation screen D2 illustrated in FIG. 6D, the switching processing unit 219 switches the display item T8 displayed in the second display area A2 to the initial display items T1 to T4 (see FIG. 6A).

Figure 7:
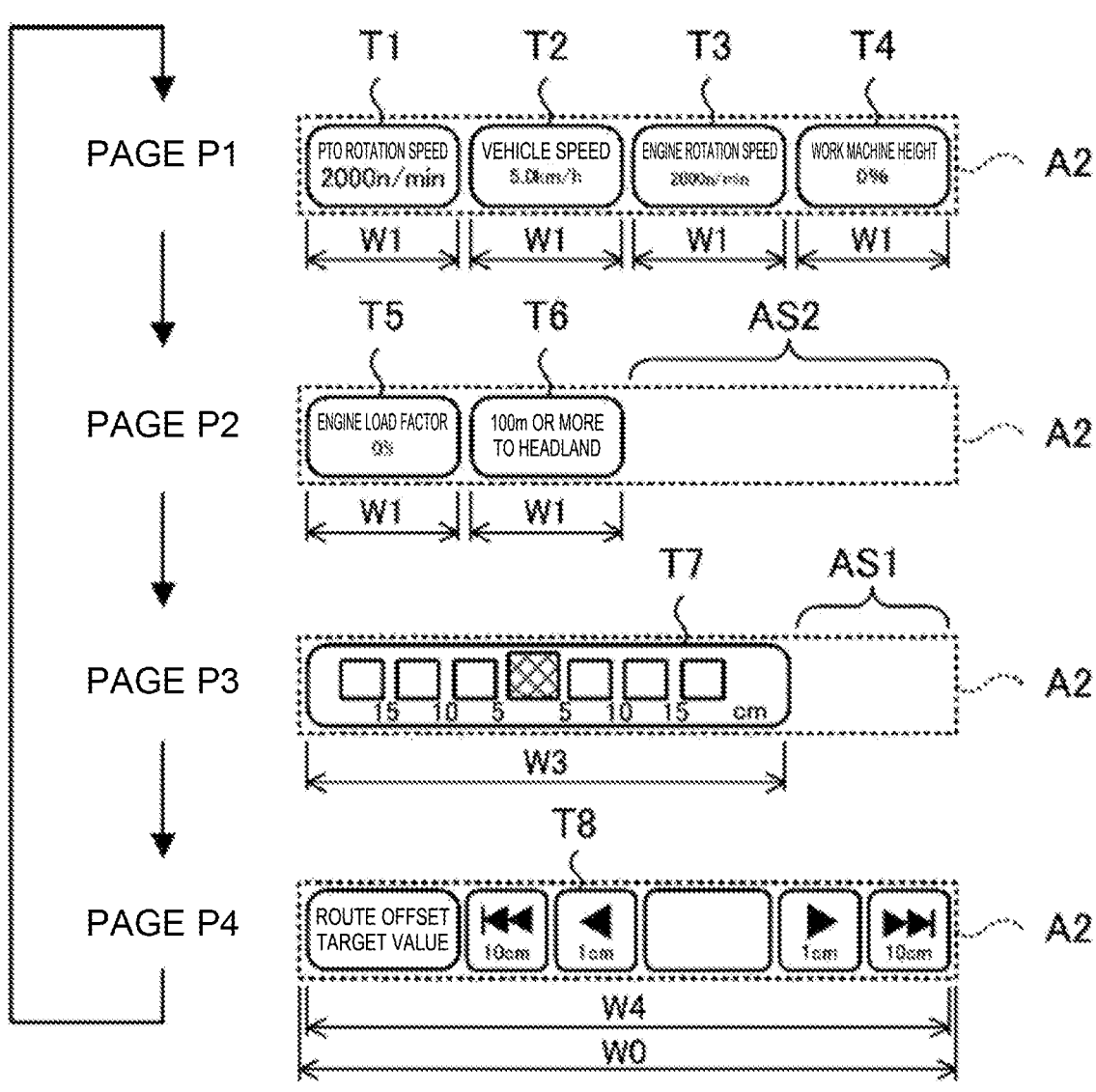
FIG. 7 is a diagram illustrating an example of screen transition of display items displayed on the operation terminal according to the embodiment of the present invention.

In this way, by selecting the switching icon K1 on the operation screen D2, the user can switch display contents of the second display area A2 as if turning pages. In other words, as illustrated in FIG. 7, the operation terminal 20 has a page P1 including the display items T1 to T4, a page P2 including the display items T5 and T6, a page P3 including the display item T7, and a page P4 including the display item T8, and switches the pages P1 to P4 sequentially in response to the user's selection operation of the switching icon K1 (here, the right side switching icon K1). As a result, the user can cause the operation terminal 20 to display the work information of a desired display item.

Note that the switching processing unit 219 switches the display items in the order of the pages P1, P2, P3, P4, P1, . . . each time the user presses the right side switching icon K1 (see FIG. 7), and switches the display items in the order of the pages P1, P4, P3, P2, P1, . . . each time the user presses the left side switching icon K1. As another embodiment, the switching processing unit 219 may perform switching such that all the display items T1 to T8 are scroll-displayed in a widthwise direction in the second display area A2. In the embodiment described above, the switching processing unit 219 switches the page P4 to the page P1 when the user presses the right side switching icon K1 while the page P4 is displayed, and switches the page P1 to the page P4 when the user presses the left side switching icon K1 while the display items on the page P1 are displayed. However, as another embodiment, the switching processing unit 219 may be configured not to switch the page P4 when the user presses the right side switching icon K1 while the page P4 is displayed, and not to switch the page P1 when the user presses the left side switching icon K1 while the page P1 is displayed. In other words, the switching processing unit 219 may be configured to switch the pages P1 to P4 back and forth between the first page P1 and the last page P4.

In order to enable such a display switching process, data of display item information Dt is stored in the storage unit 22. FIG. 5 illustrates an example of the display item information Dt.

As illustrated in FIG. 5, the display item information Dt includes information such as "display item ID", "display item name", "width", and "page" for each display item. The display item ID is identification information of a display item, and the display item name is a name of a display item. The width is a width of a display icon image corresponding to a display item. The page is identification information of a page on which a display item is displayed. The image data of the display icon image corresponding to a display item is stored in the storage unit 22 in association with the display item ID.

In the example illustrated in FIG. 5, display item IDs "T001" to "T008" corresponds to the display items T1 to T8, respectively. Since the page P1 is associated with the display item IDs "T001" to "T004", the display items T1 to T4 are displayed on the same page P1 in the second display area A2 (see FIG. 6A). In addition, since the page P2 is associated with the display item IDs "T005" and "T006", the display items T5 and T6 are displayed on the same page P2 in the second display area A2 (see FIG. 6B). In addition, since the page P3 is associated with the display item ID "T007", the display item T7 is displayed on the page P3 in the second display area A2 (see FIG. 6C), and since the page P4 is associated with the display item ID "T008", the display item T8 is displayed on the page P4 in the second display area A2 (see FIG. 6D). The number of display items registered in the display item information Dt is not limited and may be less than eight or may be eight or more.

In addition, for example, the display items T1 to T6 corresponding to the display item IDs "T001" to "T006" display the working condition (working condition) of the work vehicle, work machine, etc., the display item T7 corresponding to the display item ID "T007" displays a relationship between the travel route and the work vehicle, and the display item T8 corresponding to the display item ID "T008" displays user-operable items (setting items). The display items of the present invention are not limited to the examples described above, and can be set as appropriate in accordance with the type of the work vehicle 10.

Here, a width is set for each display item. For example, the width W1 is set for the display item IDs "T001" to "T006", the width W3 is set for the display item ID "T007", and the width W4 is set for the display item ID "T008". In addition, a width W0 (see FIG. 7) is preset for the second display area A2. Here, the relationship of width W1<width W3<width W4<width W0 is satisfied. For example, in a case where the display items T1 to T4 each having the width W1 are arranged side by side in the second display area A2, and when the overall width (≈W1×4) is smaller than the width W0, the operation control unit 21 associates the same page with the display items T1 to T4. In addition, in a case where the display items T5 and T6 each having the width W1 are arranged side by side in the second display area A2, and when a margin area AS2 (see FIG. 7) corresponding to a width W2 W1×2) is generated, the operation control unit 21 may add a display item having the width W1 or the width W2 and associate the same page with the display items T5 and T6. Similarly, in a case where the display item T7 having the width W3 is arranged in the second display area A2, and when a margin area AS1 (see FIG. 7) corresponding to the width W1 is generated, the operation control unit 21 may add a display item having the width W1 and associate the same page with the display item T7.

The second display processing unit 217 refers to the display item information Dt stored in the storage unit 22 and causes to display, in the second display area A2, the display items T1 to T4 of the display item IDs "T001" to "T004" associated with the page P1 (see FIG. 6A). In this way, the second display processing unit 217 causes to display, in the second display area A2, the number of display items arrangeable in the widthwise direction.

In addition, when the user presses the right side switching icon K1 on the operation screen D2 (see FIG. 6A), the switching processing unit 219 refers to the display item information Dt stored in the storage unit 22 and causes to display, in the second display area A2, the display items T5 and T6 of the display item IDs "T005" and "T006" associated with the page P2 (see FIG. 6B). In this way, the switching processing unit 219 refers to the display item information Dt and repeatedly switches the display items in the order of the pages P1 to P4 (see FIG. 7). In this way, the switching processing unit 219 switches from the display items being displayed in the second display area A2 to the number of display items arrangeable in the widthwise direction and causes to display the arrangeable number of display items.

The display item information Dt is preset by the user and stored in the storage unit 22. In addition, the user can appropriately change the display item information Dt. For example, when the user performs an operation of selecting a display item to be displayed on each page (e.g., pages P1 to P4), the operation control unit 21 may set the display item information Dt according to the selection operation and cause the storage unit 22 to store the display item information Dt. In addition, the user can replace the display items of each page, or can assign desired display items to the margin areas AS1 and AS2. The display item information Dt corresponding to the tractor 10 includes at least a display item (here, display item T1) representing a measurement value (e.g., rotation speed) related to the PTO.

In this way, the operation control unit 21 causes the storage unit 22 to store the information related to the display item selected by the user, and causes to display, in the second display area A2, a predetermined display item (e.g., the display items T1 to T4 of the page P1) with reference to the storage unit 22 when the working condition of the tractor 10 is displayed. As a result, the second display processing unit 217 can cause to display, in the second display area A2, the display item selected by the user. In addition, the switching processing unit 219 can switch the display items in the second display area A2 to the display items selected by the user.

As another embodiment, a plurality of pieces of the display item information Dt corresponding to the work content of the tractor 10 may be stored in the storage unit 22. For example, the operation control unit 21 may set the display item information Dt for each type of the work machine 14 (cultivator, seeder, mower, plow, fertilizer applicator or the like) and store the display item information Dt in the storage unit 22. In this case, the operation control unit 21 refers to the display item information Dt corresponding to the type of the work machine 14 selected by the user in the registration processing of the work machine information ("work machine registration" in FIG. 4), and causes to display, in the second display area A2, display items or switches such display items. For example, when the tractor 10 is attached with a mower and performs mowing work, the operation control unit 21 causes to display, in the second display area A2, the display items according to the mowing work (an example of a first work content of the invention). In this way, the display item of the present invention includes a plurality of display items corresponding to a work content by the work vehicle (for example, the tractor 10), and the operation control unit 21 causes to display, in the second display area A2, the display items corresponding to the content of work performed by the work vehicle.

Figure 8:
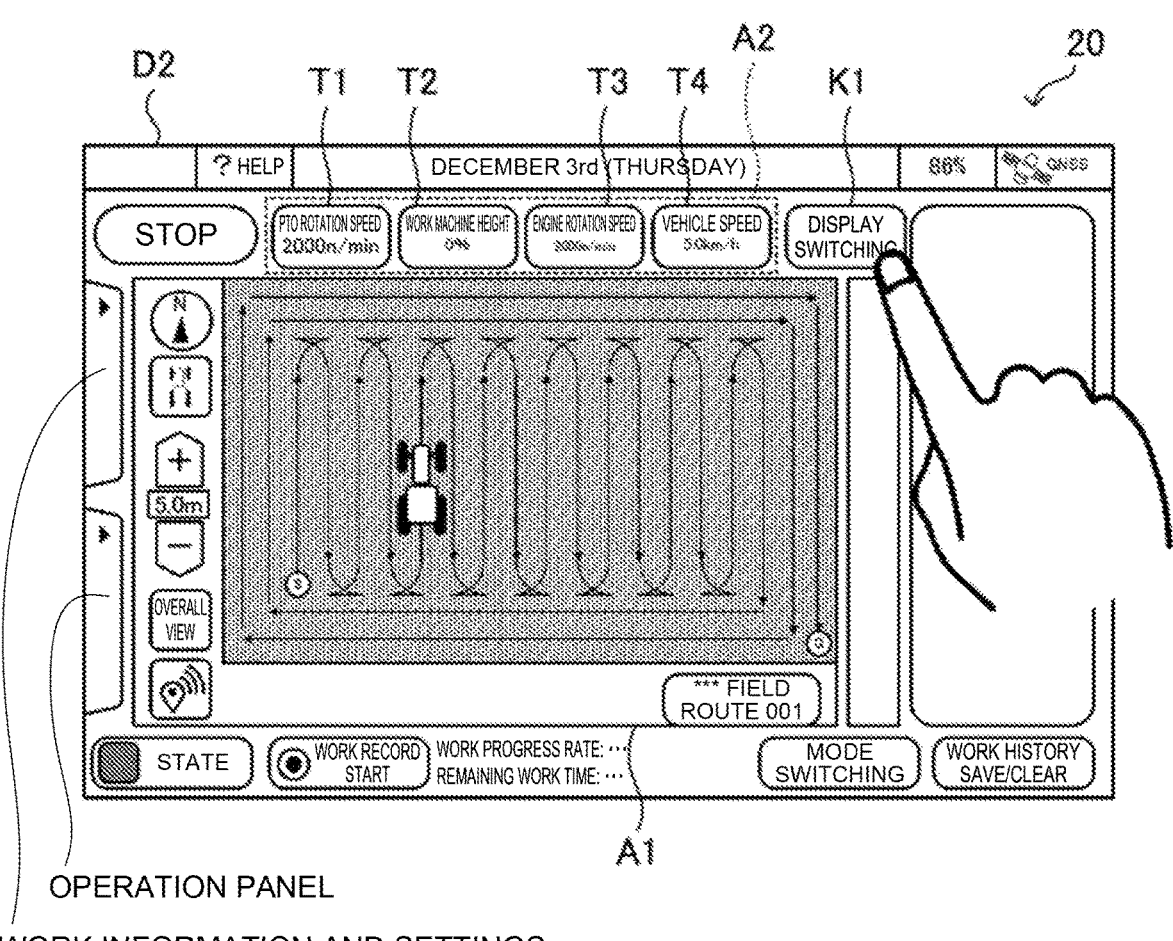
FIG. 8 is a diagram illustrating an example of the operation screen displayed on the operation terminal according to the embodiment of the present invention.

In addition, as still another embodiment, only one switching icon K1 may be provided as illustrated in FIG. 8. For example, the switching processing unit 219 causes to display, at a position adjacent to the right end portion of the second display area A2, a switching icon K1 in which "display switching" is displayed in text. Then, the switching processing unit 219 switches the display items displayed in the second display area A2 each time the user presses the switching icon K1. For example, the switching processing unit 219 repeatedly switches the display items in the order of pages P1 to P4 each time the user presses the switching icon K1 (see FIG. 7).

In addition, as described above, the display items displayed in the second display area A2 of the operation screen D2 corresponding to the tractor 10 may include not only the display items (e.g., display items T1 to T4) according to the work content of the tractor 10, but also the display items (e.g., display items T5 to T8) according to the work content common to other work vehicles 10 (e.g., a combine harvester, a rice transplanter, etc.). The display items common to a plurality of types of the work vehicles 10 include at least a display item indicating the deviation amount.

As described above, the operation control unit 21 can receive information such as the traveling condition and working condition of the tractor 10 from the tractor 10 and cause the operation display unit 23 to display the information.

The operation control unit 21 executes the following processing in addition to the above processing. For example, the first display processing unit 216 causes the operation display unit 23 to display the menu screen D1 (see FIG. 4), a registration screen (not illustrated) for registering the work vehicle information, the field information, the work information, and the like, the operation screen D2 (see FIG. 6A and the like) representing the traveling state of the automatic traveling, and the like.

In addition, the reception processing unit 218 receives a work start instruction for causing the tractor 10 to start work and a travel stop instruction for causing the tractor 10 that is traveling automatically to stop traveling from the user. When the reception processing unit 218 receives each of the instructions mentioned above, the output processing unit 215 outputs each of the instructions to the tractor 10.

When the work start instruction is acquired from the operation terminal 20, the vehicle control device 11 of the tractor 10 causes the tractor 10 to start traveling and working. In addition, when a travel stop instruction is acquired from the operation terminal 20, the vehicle control device 11 causes the tractor 10 to stop traveling and working.

Note that the operation terminal 20 may be able to access a website of an agricultural support service (agricultural support site) provided by a server (not illustrated) via the communication network N1. In this case, the operation terminal 20 can function as an operation terminal of the server by executing a browser program by the operation control unit 21. The server includes each of the processing units described above and executes each of the processing.

[Display Process]

Figure 9:
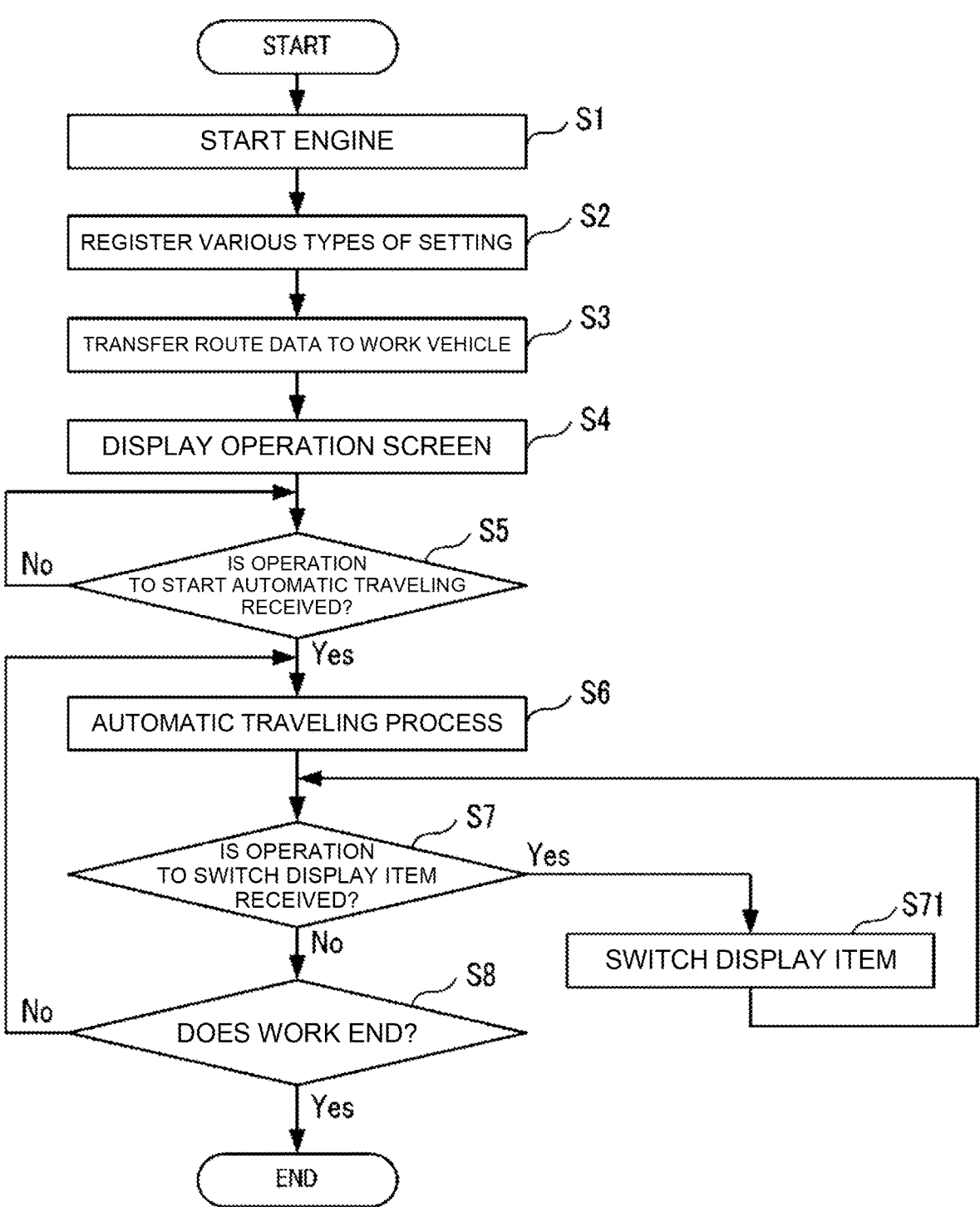
FIG. 9 is a flowchart illustrating an example of a procedure of display process executed by the operation terminal according to the embodiment of the present invention.

Hereinafter, an example of the display process executed by the operation control unit 21 of the operation terminal 20 will be described with reference to FIG. 9. For example, the display process is started by the operation control unit 21 when the engine 131 of the tractor 10 is started and the power of the operation terminal 20 is turned on.

Note that the present invention may be comprehended as an invention of a display method in which the operation control unit 21 executes a part or all of the display process, or an invention of a display program for causing the operation control unit 21 to execute a part or all of the display method. In addition, the present invention may be an invention of a display method in which one or more processors execute the display process.

In step S1, the vehicle control device 11 of the tractor 10 starts the engine 131 of the tractor 10 in response to the engine start operation by the user. When the engine 131 is started, the positioning control unit 161 executes orientation recognition process (initialization). In addition, the operation control unit 21 of the operation terminal 20 turns on the power of the operation terminal 20 in response to a power-on operation by the user and causes the operation display unit 23 of the operation terminal 20 to display the menu screen D1 (see FIG. 4).

Next, in step S2, the operation control unit 21 registers various types of setting information. Specifically, the operation control unit 21 registers the work vehicle information, the field information, the work information, and the travel route information (travel route R) based on the setting operation by the user (see FIG. 4).

Next, in step S3, the operation control unit 21 transfers the route data of the generated travel route R to the tractor 10. The vehicle control device 11 of the tractor 10 stores the route data acquired from the operation terminal 20 in the storage unit 12.

Next, in step S4, the operation control unit 21 causes the operation display unit 23 of the operation terminal 20 to display the operation screen D2 (see FIG. 6A), which displays work information and other information. In addition, the operation control unit 21 causes to display the map information including the current position of the tractor 10 in the first display area A1 of the operation screen D2, and causes to display the display items representing the current working condition of the tractor 10 in the second display area A2. For example, the operation control unit 21 refers to the display item information Dt (see FIG. 5) in the storage unit 22 and causes to display, in the second display area A2, the display items T1 to T4 associated with the page P1 (see FIG. 6A).

The operation screen D2 illustrated in FIG. 6A illustrates an example of a state after the start of automatic traveling (during automatic traveling) for convenience, but the operation screen D2 displayed in step S4 illustrates a state before the start of automatic traveling, for example, a state in which the measurement value of each display item is an initial value.

Next, in step S5, the operation control unit 21 determines whether or not an operation to start the automatic traveling is received from the user. For example, when the current position of the tractor 10 coincides with the work start position S, the operation control unit 21 receives an operation (pressing the start button) to start the automatic traveling from the user on the operation screen D2. When an automatic traveling start operation is received (S5: Yes), the operation control unit 21 outputs a work start instruction to the tractor 10. The process then proceeds to step S6. On the other hand, when the automatic traveling start operation is not received, the operation control unit 21 waits until the automatic traveling start operation is received (S5: No).

In step S6, the vehicle control device 11 of the tractor 10 causes the tractor 10 to automatically travel along the travel route R based on the position information that is positioned by the RTK method. In addition, the vehicle control device 11 outputs, to the operation terminal 20, information on various measurement values (PTO rotation speed, vehicle speed, engine rotation speed, etc.) that is measured during automatic traveling.

Next, in step S7, the operation control unit 21 determines whether a switching operation to switch the display items displayed in the second display area A2 of the operation screen D2 is received from the user. For example, when the user wants to check the current engine load factor of the tractor 10 or wants to check the distance from the current position of the tractor 10 to the headland, the user presses the switching icon K1 (right side switching icon K1) on the operation screen D2 (see FIG. 6A). When the operation control unit 21 receives the switching operation of the user (S7: Yes), the process proceeds to step S71. On the other hand, when the operation control unit 21 does not receive the switching operation of the user (S7: No), the process proceeds to step S8.

In step S8, the vehicle control device 11 determines whether or not the tractor 10 ends the work. When the tractor 10 ends the work (S8: Yes), the display process ends. On the other hand, when the tractor 10 does not end the work (S8: No), the process returns to step S6 and the tractor 10 continues the automatic traveling.

In step S71, the operation control unit 21 switches the display item displayed in the second display area A2 of the operation screen D2. For example, when the user presses the switching icon K1 (right side switching icon K1) on the operation screen D2 (see FIG. 6A), the operation control unit 21 switches from the display items T1 to T4 corresponding to the page P1 being displayed in the second display area A2 to the display items T5 and T6 corresponding to the page P2 (see FIG. 5) and causes to display the display items T5 and T6 (see FIG. 6B). For example, if the user presses the left side switching icon K1 on the operation screen D2 (see FIG. 6A), the operation control unit 21 switches from the display items T1 to T4 corresponding to the page P1 being displayed in the second display area A2 to the display item T8 corresponding to the page P4 and causes to display the display item T8 (see FIG. 6D). The process then returns to step S7.

Returning to step S7, when the user presses the right side switching icon K1 again (S7: Yes), the operation control unit 21 switches from the display items T5 and T6 corresponding to the page P2 being displayed in the second display area A2 to the display item T7 corresponding to the page P3 (see FIG. 5) and causes to display the display item T7 (see FIG. 6C) (S71). In addition, when the user presses the left side switching icon K1 (S7: Yes), the operation control unit 21 switches from the display items T5 and T6 corresponding to the page P2 being displayed in the second display area A2 to the display items T1 to T4 corresponding to the original page P1 and causes to display the display items T1 to T4 (see FIG. 6A) (S71). In this way, the user can check the working condition, the traveling condition, etc. by switching the display items on the operation screen D2 of the operation terminal 20 to display the desired display items from the time the tractor 10 starts the automatic traveling until the tractor 10 ends the work. The operation control unit 21 executes the display process as described above.

As explained above, the operation terminal 20 according to the present embodiment causes the operation display unit 23 of the operation terminal 20 to display the information on the work by the tractor 10. In addition, the operation terminal 20 causes to display the map information including at least the current position of the tractor 10 in the preset first display area A1 of the operation display unit 23, and causes to display the display items representing the current working condition of the tractor 10 in the preset second display area A2 of the operation display unit 23. In addition, the operation terminal 20 switches the first display item representing the first working condition displayed in the second display area A2 to the second display item representing the second working condition.

For example, in a case where the operation terminal 20 is displaying the first display item representing the first working condition (e.g., PTO rotation speed) in the second display area A2, and when the switching operation of switching the display item by the user is received, the first display item is switched to the second display item representing the second working condition (e.g., engine load factor). The operation terminal 20 causes the operation display unit 23 to display the switching icon K1 (switching unit) for receiving the switching operation by the user.

According to the above configuration, the user can check the working condition, the traveling condition, etc. by displaying the desired display items on the operation terminal 20 during the automatic traveling of the tractor 10. In addition, since the user can switch the display items only by selecting the switching icon K1 displayed on the operation screen D2 of the operation terminal 20, the operability and convenience of the operation terminal 20 can be improved.

Furthermore, the user can preset display items (default display items) to be displayed in the second display area A2 at the start of the automatic traveling, a display order (switching order) of display items to be displayed in the second display area A2, a combination of display items when a plurality of items are displayed together in the second display area A2, and the like, and can cause storage unit 22 to store the set information (display item information Dt (see FIG. 5)). In addition, the user can also appropriately update the display item information Dt. Then, the operation control unit 21 can refer to the display item information Dt and identify the display items to be displayed in the second display area A2.

OTHER EMBODIMENTS

The present invention is not limited to the above embodiments, but may be the following embodiments.

In the above embodiments, the operation control unit 21 of the operation terminal 20 switches the display items being displayed in the second display area A2 on the condition that the switching operation of the user is received. As another embodiment, in a case where the first display item corresponding to the first working condition is displayed in the second display area A2, and when the measurement value corresponding to the second working condition is out of an allowable range, the operation control unit 21 may switch the first display item to the second display item. For example, in a case where the display items T1 to T4 are displayed in the second display area A2, and when the deviation amount between the target route and the current travel route of the tractor 10 is out of a preset allowable range (exceeds a threshold value), the operation control unit 21 switches the display items T1 to T4 to the display item T7 representing the deviation amount. In this way, when a measurement value of a display item not displayed in the second display area A2 is out of an allowable range, the operation control unit 21 may automatically switch the display item being displayed in the second display area A2 to the display item whose measurement value is out of the allowable range. As a result, the user can be alerted.

In addition, when a measurement value of a display item is out of an allowable range, the operation control unit 21 may change a display mode of the display item on the operation screen D2. For example, the operation control unit 21 may light or blink the display icon image of the display item for which the measurement value of the display item is out of the allowable range on the operation screen D2.

In the above embodiments, the case in which the work vehicle 10 is a tractor is given as an example, but the work vehicle 10 may be a combine harvester, a rice transplanter, or the like.

For example, when the work vehicle 10 is a combine harvester, the operation control unit 21 refers to display item information Dc corresponding to the combine harvester and causes to display the display items in the second display area A2. FIG. 10A illustrates an example of the display item information Dc. The display item information Dc includes information on a plurality of display items according to a work content of the combine harvester (e.g., harvesting work). For example, the combine harvester temporarily stores harvested crops in a tank mounted on the combine harvester. When a storage amount of the tank exceeds a threshold value, the combine harvester cannot continue the harvesting work. For this reason, the user needs to check working conditions such as a current storage amount in the tank (or available storage amount of the tank), an allowable reaping travel distance, and the like. Therefore, in the display item information Dc, a display item C1 (display item ID "C001"), which represents the current storage amount, and a display item C2 (display item ID "C002"), which represents the allowable reaping travel distance at the present time, are registered as display items corresponding to the work content of the combine harvester.

In addition, the display item information Dc may also include display items (e.g., display items C3 to C6) according to the work content common to other work vehicles 10 (e.g., a tractor, a rice transplanter, etc.).

Figure 11A:
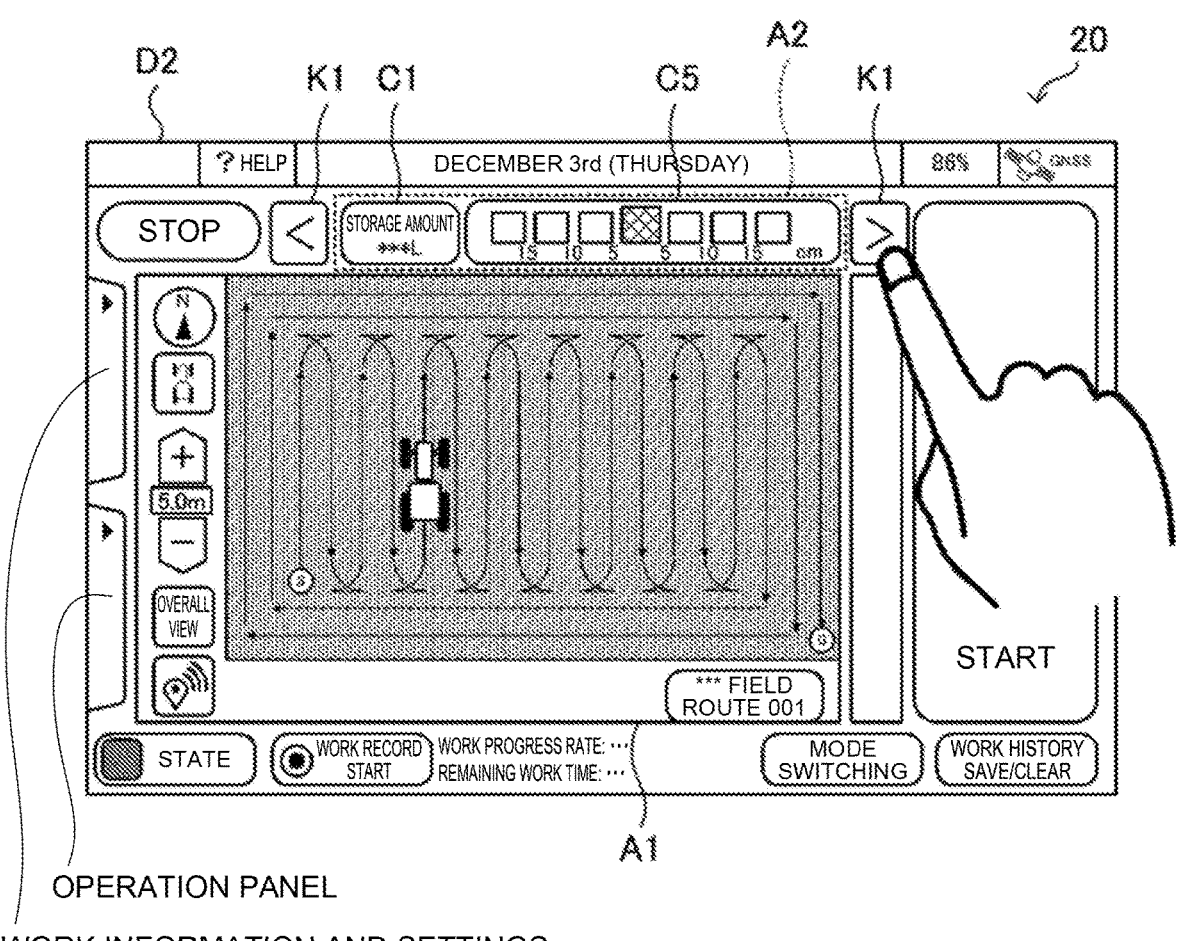
FIG. 11A is a diagram illustrating an example of the operation screen displayed on the operation terminal according to the embodiment of the present invention.

FIG. 11 illustrates a display example of the operation screen D2 in a case where the work vehicle 10 is a combine harvester. The combine harvester is equipped with a storage part for storing harvested crops. For example, when route data for automatic traveling of the combine harvester is normally transferred from the operation terminal 20 to the combine harvester, the second display processing unit 217 refers to the display item information Dc (see FIG. 10A) stored in the storage unit 22 and causes to display, in the second display area A2, the display items C1 and C5 of the display item IDs "C001" and "C005" associated with the page P1 (see FIG. 11A).

Figure 11B:
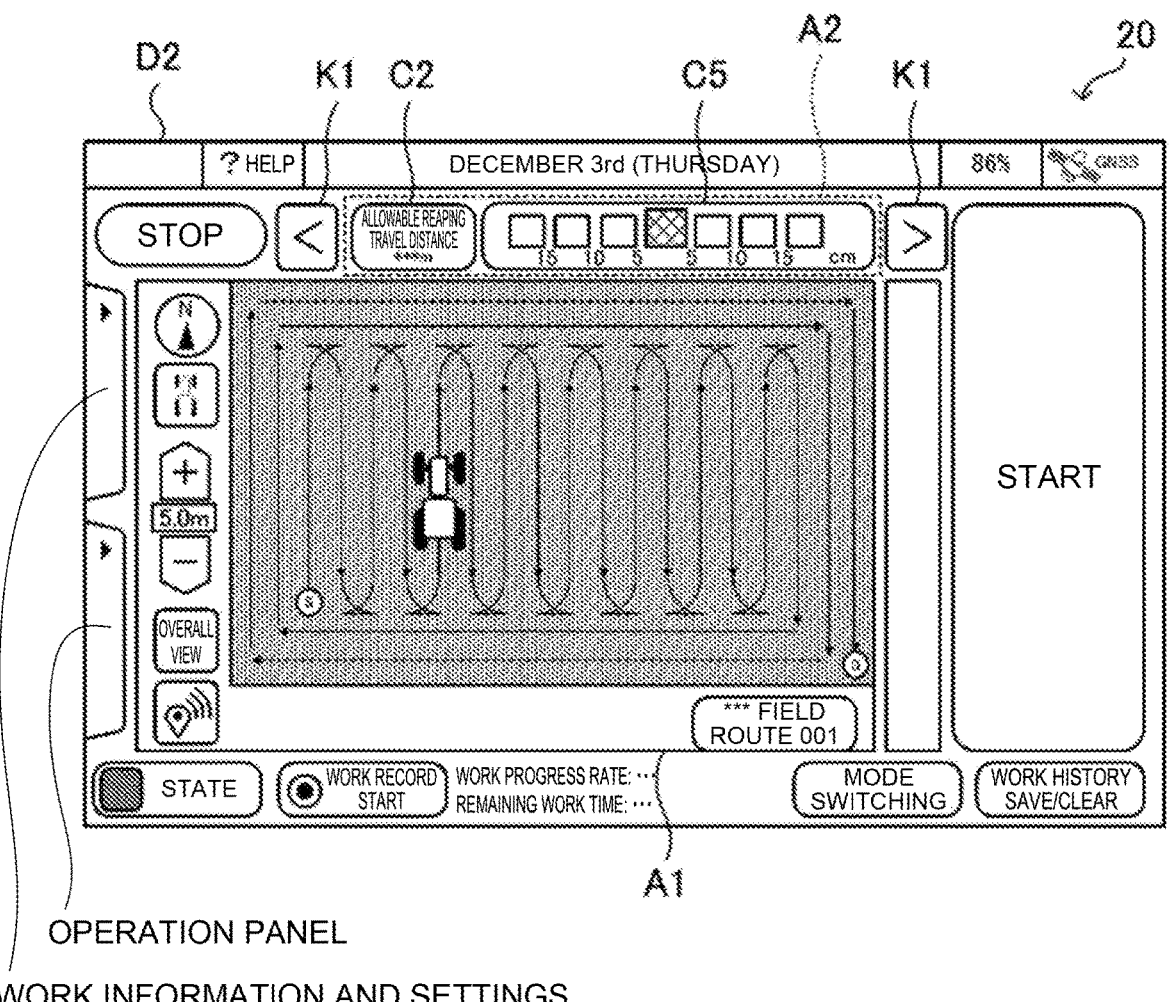
FIG. 11B is a diagram illustrating an example of the operation screen displayed on the operation terminal according to the embodiment of the present invention.

When the user presses the right side switching icon K1 on the operation screen D2 (see FIG. 11A), the switching processing unit 219 refers to the display item information Dc and causes to display, in the second display area A2, the display items C2 and C5 of the display item IDs "C002" and "C005" associated with the page P2 (see FIG. 11B). In this way, the switching processing unit 219 refers to the display item information Dc and repeatedly switches the display items in the order of the pages P1 to P4. Here, a plurality of "pages" may be associated with a single display item, such as the display item C5 (see FIG. 11A). As a result, even when the page is switched, a specific display item (here, display item C5) can be continuously displayed. The display item information Dc corresponding to the combine harvester includes at least a display item (here, display item C1) representing a storage condition (storage amount) of the storage part. In addition, in FIG. 11A and FIG. 11B, for convenience, the map information displayed in the first display area A1 is illustrated in the same state as the map information illustrated in FIG. 6, but actually the map information corresponding to the combine harvester is displayed.

For example, when the work vehicle 10 is a rice transplanter, the operation control unit 21 refers to display item information Dr corresponding to the rice transplanter and causes to display the display items in the second display area A2. FIG. 10B illustrates an example of the display item information Dr. The display item information Dr includes information on a plurality of display items according to a work content of the rice transplanter (e.g., rice transplanting work). For example, a display item R1 (display item ID "R001") representing a remaining work area out of the work region is registered in the display item information Dc.

Figure 12A:
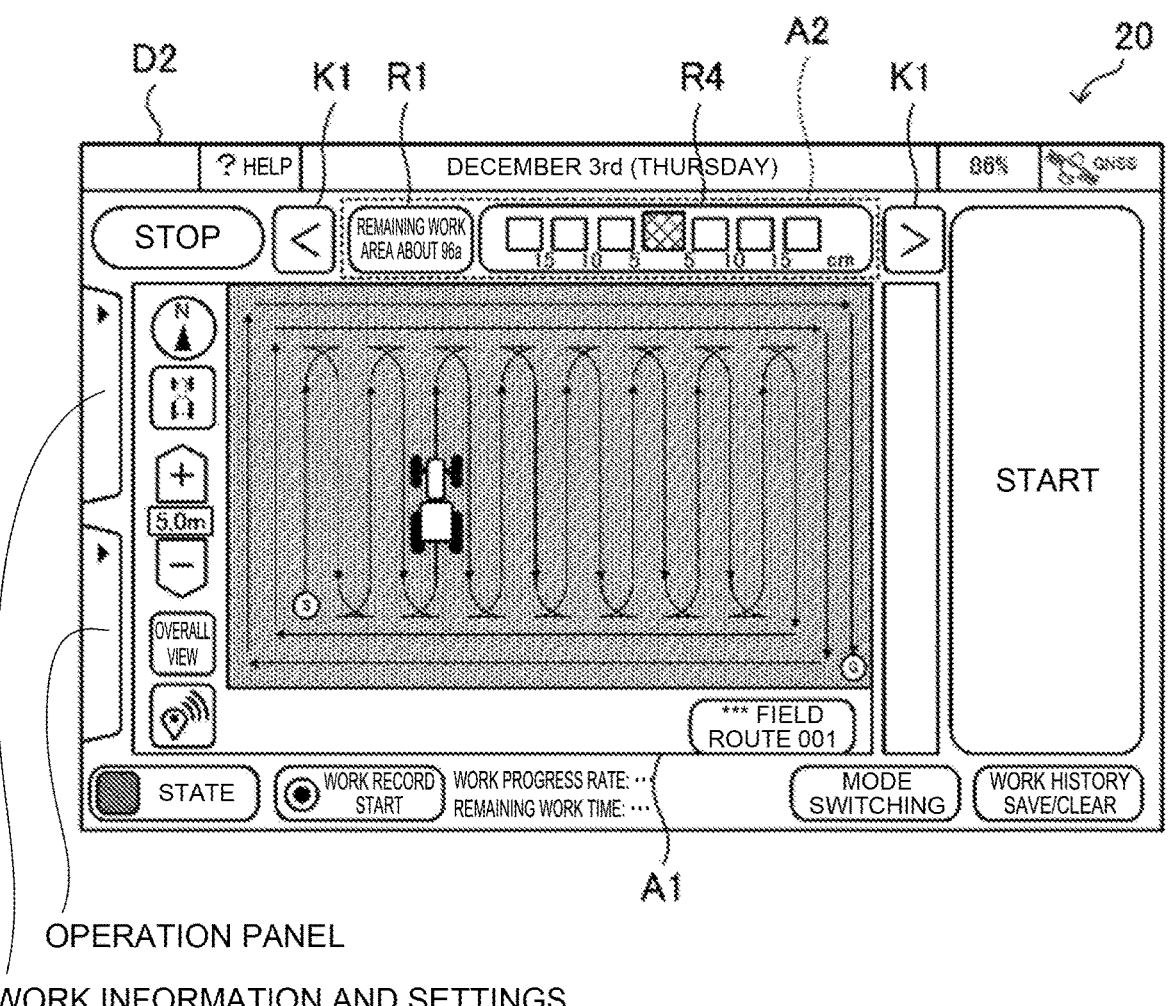
FIG. 12A is a diagram illustrating an example of the operation screen displayed on the operation terminal according to the embodiment of the present invention.

FIG. 12 illustrates a display example of the operation screen D2 in a case where the work vehicle 10 is a rice transplanter. The rice transplanter is equipped with a planting unit for planting seedlings. For example, when route data for automatic traveling of the rice transplanter is normally transferred from the operation terminal 20 to the rice transplanter, the second display processing unit 217 refers to the display item information Dr (see FIG. 10B) stored in the storage unit 22, and causes to display, in the second display area A2, the display items R1 and R4 of the display item IDs "R001" and "R004" associated with the page P1 (see FIG. 12A).

Figure 12B:
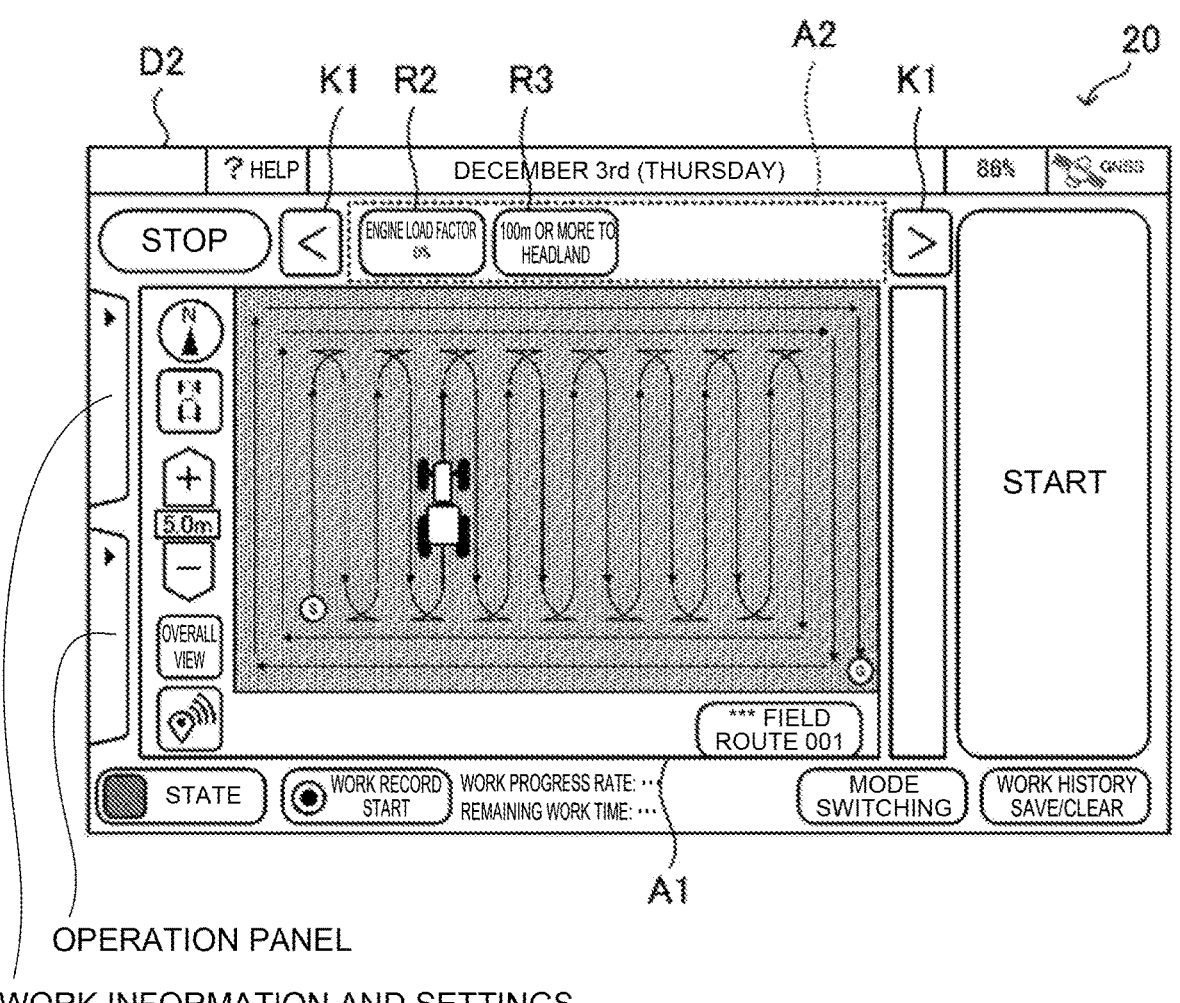
FIG. 12B is a diagram illustrating an example of the operation screen displayed on the operation terminal according to the embodiment of the present invention.

When the user presses the right side switching icon K1 on the operation screen D2 (see FIG. 12A), the switching processing unit 219 refers to the display item information Dr, and causes to display, in the second display area A2, display items R2 and R3 of display item IDs "R002" and "R003" associated with the page P2 (see FIG. 12B). In this way, the switching processing unit 219 refers to the display item information Dr and repeatedly switches the display items in the order of the pages P1 to P3. The display item information Dr corresponding to the rice transplanter includes at least a display item (here, display item R1) representing a remaining work area out of the work region. In addition, in FIG. 12, for convenience, the map information displayed in the first display area A1 is illustrated in the same state as the map information illustrated in FIG. 6, but actually the map information corresponding to the rice transplanter is displayed.

As described above, one operation terminal 20 can be commonly used for a plurality of types of work vehicles 10. For example, when the operation terminal 20 is used for a tractor, a management application corresponding to the tractor is stored in the operation terminal 20, so that the tractor can be operated and managed by the operation terminal 20. In addition, for example, when the operation terminal 20 is used for a combine harvester, a management application corresponding to the combine harvester is stored in the operation terminal 20, so that the combine harvester can be operated and managed by the operation terminal 20. In addition, for example, when the operation terminal 20 is used for a rice transplanter, a management application corresponding to the rice transplanter is stored in the operation terminal 20, so that the rice transplanter can be operated and managed by the operation terminal 20.

Figure 13:
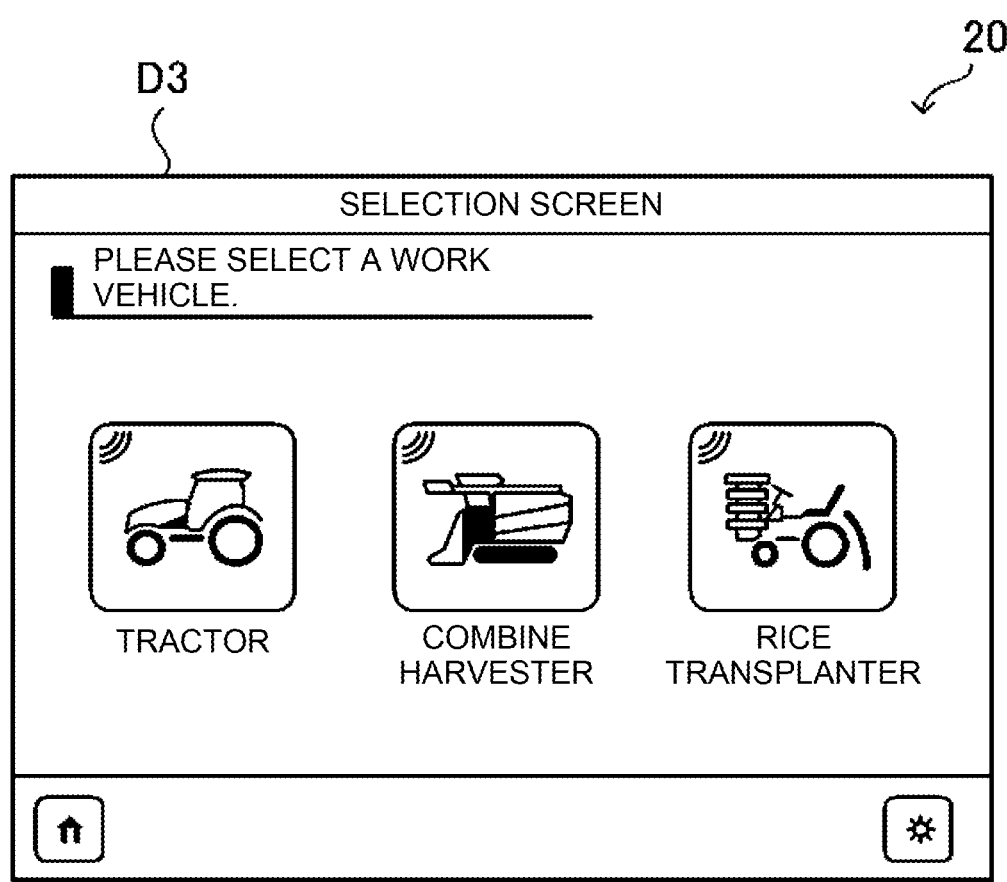
FIG. 13 is a diagram illustrating an example of a selection screen displayed on the operation terminal according to the embodiment of the present invention.

As another embodiment, the storage unit 22 of the operation terminal 20 may store management applications corresponding to a plurality of types of the work vehicles 10, respectively. For example, the storage unit 22 of the operation terminal 20 stores a management application corresponding to a tractor, a management application corresponding to a combine harvester, and a management application corresponding to a rice transplanter. In this case, the user selects the type of the work vehicle 10 to be used, for example, on a selection screen D3 illustrated in FIG. 13. When the user selects, for example, "tractor" on the selection screen D3, the operation control unit 21 starts the management application corresponding to the tractor stored in the storage unit 22. As a result, the operation control unit 21 causes the operation display unit 23 to display the operation screen D2 for the tractor, such as FIG. 6A to FIG. 6D. In addition, when the user selects, for example, "combine harvester" on the selection screen D3, the operation control unit 21 starts the management application corresponding to the combine harvester stored in the storage unit 22. As a result, the operation control unit 21 causes the operation display unit 23 to display the operation screen D2 for the combine harvester, such as FIG. 11A and FIG. 11B. In addition, when the user selects, for example, "rice transplanter" on the selection screen D3, the operation control unit 21 starts the management application corresponding to the rice transplanter stored in the storage unit 22. As a result, the operation control unit 21 causes the operation display unit 23 to display the operation screen D2 for the rice transplanter, such as FIG. 12A and FIG. 12B.

According to this configuration, a user can easily operate and manage various types of the work vehicles 10 with a single operation terminal 20. Thus, the user can easily operate and manage the work vehicle 10 with the operation terminal 20, even when different type of the work vehicle 10 is introduced. The operation terminal 20 may be able to download management applications of the work vehicle 10 from a website. In addition, each of the management applications may be stored in a web server (cloud server), and the operation terminal 20 may access the web server to execute the management applications.

In addition, as still another embodiment, a plurality of pieces of display item information may be stored in the storage unit 22 according to traveling modes of the work vehicle 10 (tractor, combine harvester, rice transplanter, etc.). The traveling modes include a traveling mode in which the vehicle travels by manned automatic driving, a traveling mode in which the vehicle travels by unmanned automatic driving, and a traveling mode in which the vehicle travels by automatic steering on a straight line. For example, the operation control unit 21 may set display item information for each type of the traveling modes and store the display item information in the storage unit 22. In this case, the operation control unit 21 refers to the display item information corresponding to the type of the traveling mode selected by the user in the route generation processing ("route generation" in FIG. 4), and causes to display the display item in the second display area A2 or switches the display item.

The invention claimed is:

1. A display method for causing a display unit of a display terminal to display information on work performed by a work vehicle, the display method comprising:
   causing display, in a preset first display area of the display unit, of map information including at least a current position of the work vehicle;
   causing display, in a preset second display area of the display unit that does not overlap the preset first display area, of a display item representing a current working condition of the work vehicle; and
   without changing a display range of the map information in the preset first display area, switching a first display item representing a first working condition displayed in the preset second display area to a second display item representing a second working condition.

2. The display method according to claim 1, further comprising:
   causing display, at a position corresponding to the preset second display area in the display unit, of a switching unit that receives a switching operation from a user to switch the first display item to the second display item.

3. The display method according to claim 1, further comprising:
   switching the first display item to the second display item in a case where the first display item is displayed in the preset second display area and based on a measurement value corresponding to the second working condition being out of an allowable range.

4. The display method according to claim 1, wherein:
   the display item includes a plurality of display items corresponding to a work content by the work vehicle, and
   the first display item corresponding to a first work content by the work vehicle is displayed in the preset second display area.

5. The display method according to claim 1, further comprising:
   causing display, in the preset second display area, of the first display item selected by a user.

6. The display method according to claim 5, further comprising:
   causing a storage unit to store information on the first display item selected by the user; and
   referring to the storage unit and causing display of the first display item in the preset second display area based on causing display of the second working condition of the work vehicle.

7. The display method according to claim 1, wherein:
   a width of the preset second display area is preset, a number of the first display item is arrangeable in a widthwise direction is displayed in the preset second display area, and a number of the second display item is arrangeable in the widthwise direction is displayed in the preset second display area, as a result of switching from the first display item.

8. The display method according to claim 1, wherein, based on the work vehicle being configured to be attached with a work machine, at least one of the first display item or the second display item is a display item representing a measurement value related to Power Take Off (PTO).

9. The display method according to claim 1, wherein, based on the work vehicle being equipped with a planting unit for planting seedlings, at least one of the first display item or the second display item is a display item representing a remaining work area out of a work region.

10. The display method according to claim 1, wherein, based on the work vehicle being equipped with a storage part for storing harvested crops, at least one of the first display item or the second display item is a display item representing a storage condition of the storage part.

11. The display method according to claim 1, wherein:

at least one of the first display item or the second display item is a display item representing a deviation amount between a target route and a current travel route of the work vehicle, and the display item representing the deviation amount is a display item common to a plurality of types of work vehicles.

12. The display method according to claim 1, wherein:

the display item includes a plurality of display items, the second display item includes a second plurality of display items, and switching the plurality of display items representing the first working conditions displayed in the preset second display area to the second plurality of display items representing the second working conditions displayed in the preset second display area is in response to receiving a switching operation.

13. The display method according to claim 1, wherein a single switching unit is displayed at a position corresponding to the second display area in the display unit, and when a switching operation of pressing the switching unit by a user is received, the first display item is switched to the second display item.

14. The display method according to claim 1, wherein the first display item is switched to the second display item such that the first display item is no longer visible in the preset second display area.

15. A display terminal for causing a display unit to display information on work performed by a work vehicle, the display terminal comprising:

a first display processing unit configured to cause display, in a preset first display area of the display unit, of map information including at least a current position of the work vehicle;

a second display processing unit configured to cause display, in a preset second display area of the display unit that does not overlap the preset first display area, of a display item representing a current working condition of the work vehicle; and a switching processing unit configured to, without changing a display range of the map information in the preset first display area, switch a first display item representing a first working condition displayed in the preset second display area to a second display item representing a second working condition.

16. A non-transitory, computer-readable medium storing a display program, which when executed by one or more processors, causes the one or more processors to:

cause display, in a preset first display area of the display unit, of map information including at least a current position of the work vehicle;

cause display, in a preset second display area of the display unit that does not overlap the preset first display area, of a display item representing a current working condition of the work vehicle; and without changing a display range of the map information in the preset first display area, switch a first display item representing a first working condition displayed in the preset second display area to a second display item representing a second working condition.

* * * * *